United States Patent
Watanabe

(10) Patent No.: US 10,807,590 B2
(45) Date of Patent: Oct. 20, 2020

(54) CONTROL DEVICE FOR FOUR-WHEEL DRIVE VEHICLE

(71) Applicant: TOYOTA JIDOSHA KABUSHIKI KAISHA, Toyota-shi, Aichi-ken (JP)

(72) Inventor: Ryochi Watanabe, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 333 days.

(21) Appl. No.: 15/918,398

(22) Filed: Mar. 12, 2018

(65) Prior Publication Data
US 2018/0265077 A1    Sep. 20, 2018

(30) Foreign Application Priority Data

Mar. 15, 2017   (JP) ................................ 2017-050146

(51) Int. Cl.
    *B60W 30/02*          (2012.01)
    *B60W 10/14*          (2012.01)
               (Continued)

(52) U.S. Cl.
CPC .......... *B60W 30/02* (2013.01); *B60W 10/119* (2013.01); *B60W 10/14* (2013.01); *B60W 10/184* (2013.01); *B60W 10/188* (2013.01); *B60W 30/18109* (2013.01); *B60W 30/18172* (2013.01); *B60W 2300/18* (2013.01); *B60W 2400/00* (2013.01); *B60W 2520/10* (2013.01); *B60W 2520/263* (2013.01); *B60W 2556/00* (2020.02); *B60W 2710/125* (2013.01); *B60W 2710/182* (2013.01); *B60W 2720/403* (2013.01)

(58) Field of Classification Search
CPC ..................................................... B60W 30/02
See application file for complete search history.

(56) References Cited

U.S. PATENT DOCUMENTS 5,270,930 A * 12/1993 Ito ........................ B60K 17/346
                                                     701/69
5,282,138 A * 1/1994 Sano ....................... B60T 8/175
                                                     701/81
(Continued)

FOREIGN PATENT DOCUMENTS

JP         H06-344876 A     12/1994
JP         H08-053058 A      2/1996
(Continued)

*Primary Examiner* — Michael A Berns
(74) *Attorney, Agent, or Firm* — Oliff PLC

(57) ABSTRACT

The control device of a four-wheel drive vehicle is applied to a four-wheel drive vehicle having a differential restriction device which can change a differential restriction degree between a front wheel rotary shaft and a rear wheel rotary shaft, a braking device can separately change a braking force of the front wheels and a braking force of the rear wheels. The control device determines whether a specific state which has a high possibility that a state where a rear wheel slip ratio becomes larger than a front wheel slip ratio is generated occurs assuming that the differential restriction degree is set to a first degree when the differential restriction degree is set to a second degree so as not to allow the differential operation and change the differential restriction degree from the second degree to the first degree when it is determined that the specific state has occurred.

8 Claims, 10 Drawing Sheets

(51) Int. Cl.
    *B60W 10/184*   (2012.01)
    *B60W 30/18*    (2012.01)
    *B60W 10/119*   (2012.01)
    *B60W 10/188*   (2012.01)

(56)　　　　　　References Cited

U.S. PATENT DOCUMENTS

| | | | |
|---|---|---|---|
| 6,189,643 | B1 | 2/2001 | Takahashi et al. |
| 8,930,111 | B2 * | 1/2015 | Watanabe ............ B60T 8/1761 |
| | | | 701/71 |
| 9,132,813 | B2 * | 9/2015 | Matsuda ............... B60T 8/1706 |
| 9,744,953 | B2 * | 8/2017 | Udaka .................... B60T 8/1766 |
| 10,392,008 | B2 * | 8/2019 | Watanabe ............ B60W 10/184 |
| 2012/0303234 | A1 | 11/2012 | Matsuda |
| 2013/0204503 | A1 | 8/2013 | Watanabe |
| 2015/0175140 | A1 * | 6/2015 | Shimizu ................. B60T 8/245 |
| | | | 701/70 |
| 2015/0224978 | A1 * | 8/2015 | Shimizu ................ B60W 40/13 |
| | | | 701/70 |
| 2018/0265077 | A1 * | 9/2018 | Watanabe ........ B60W 30/18109 |
| 2020/0062229 | A1 * | 2/2020 | Amamoto ................. B60T 8/76 |

FOREIGN PATENT DOCUMENTS

| | | |
|---|---|---|
| JP | H10-138895 A | 5/1998 |
| JP | H11-123946 A | 5/1999 |
| JP | 2000-085394 A | 3/2000 |
| JP | 2001-260854 A | 9/2001 |
| JP | 2007-282406 A | 10/2007 |
| JP | 2012-096610 A | 5/2012 |
| JP | 2012-136045 A | 7/2012 |
| JP | 2012-245843 A | 12/2012 |
| JP | 2013-49292 A | 3/2013 |
| JP | 2013-256253 A | 12/2013 |

* cited by examiner

CONTROL DEVICE FOR FOUR-WHEEL DRIVE VEHICLE

BACKGROUND OF THE INVENTION

1. Field of the Invention

The present invention relates to a control device for a four-wheel drive vehicle, which comprises a differential limiting/restriction device for limiting differential (operation) between a front wheel rotary shaft and a rear wheel rotary shaft.

2. Description of the Related Art

In general, some of control devices for vehicles which can perform anti-skid control (ABS control) comprise an EBD (Electronic Brake force Distribution) systems. The EBD system adjusts a braking force distribution between front wheels and rear wheels and a braking force distribution between left wheels and right wheels. According to the control by the EBD system, a braking force of the front wheels is increased when a deviation obtained by subtracting a wheel speed of the rear wheels from a wheel speed of the front wheels is a positive value, and a braking force of the rear wheels is increased when the deviation is a negative value. A conventional control device using the EBD system (hereinafter referred to as "conventional device") is known which controls braking forces in accordance with a braking force distribution ratio (hereinafter also referred to as "ideal distribution ratio") which is based on a ground contact load ratio between the front wheels and the rear wheels (for example, refer to Japanese Patent Application Laid-open (Kokai) No. H10-138895).

In a four-wheel drive vehicle, when braking is performed in a state where the differential restriction/limiting degree between the front wheels and the rear wheels is set to be high, a deviation/difference between the wheel speed of the front wheels and the wheel speed of the rear wheels is small. Thus, in this instance, the generated braking force varies roughly in accordance with the ideal distribution ratio, similarly to the conventional device. Especially, when the differential (speed difference) between the front wheels and the rear wheels are not allowed, the braking force varies in accordance with the ideal distribution ratio since the speed of the front wheels and the speed of the rear wheels are equal to each other.

When the braking force continues increasing in accordance with the ideal distribution ratio so that the braking force of the rear wheels become excessive, a traveling stability of the vehicle degrades due to a decrease in a lateral force of each of the rear wheels. Thus, if the braking force of the rear wheels can be controlled so as not to increase (so as to be held) by the EBD control before the braking force of the rear wheels becomes excessive, the braking force distribution ratio of the braking force of the rear wheels to the braking force of the front wheels is lowered so that the traveling stability of the vehicle can be secured.

However, as described above, since the EBD control is performed based on the deviation between the wheel speed of the front wheels and the wheel speed of the rear wheels, the EBD control is difficult to be performed when the braking is performed in a state where the differential restriction degree between the front wheels and the rear wheels is high. Therefore, it may be difficult to secure the traveling stability of the vehicle due to the decrease in the lateral forces of the rear wheels, even if the EBD control is used.

SUMMARY OF THE INVENTION

The present invention is made to solve the problem mentioned above. That is, one of the objects of the present invention is to provide a control device for a four-wheel drive vehicle, which is able to prevent the excessive decrease in the lateral forces of rear wheels to secure the traveling stability of the vehicle even when the braking is performed in the state where the differential operation between the front wheels and the rear wheels is not allowed.

A control device (hereinafter referred to as "present invention device") for a four-wheel drive vehicle according to the present invention is applied to the four-wheel drive vehicle (10). The vehicle (10) includes:

- a driving unit which generates a driving force (20);
- a center differential device (31) which transmits the driving force to a front wheel rotary shaft (32) and a rear wheel rotary shaft (33) and allows a differential operation between the front wheel rotary shaft and the rear wheel rotary shaft;
- a differential restriction device (34) installed in the center differential device, the differential restriction device being capable of varying a differential restriction degree (Tcu) between the front wheel rotary shaft and the rear wheel rotary shaft; and
- a braking device (40) which can vary a braking force of front wheels and a braking force of rear wheels, separately (independently from each other).

The present invention device comprises:

- a differential restriction control unit (110) which adjusts the differential restriction degree; and
- a braking control unit (120) which executes an EBD control for adjusting the braking force of the front wheels and the braking force of the rear wheels to have the braking force of the rear wheels become smaller than a braking force of the rear wheels determined based on an ideal distribution ratio obtained when a slip ratio (SLf) of the front wheels and a slip ratio (SLr) of the braking force of the rear wheels are equal to each other, when a request for braking the vehicle occurs and the differential restriction degree is set at a first degree (Tcu=0) by the differential restriction control unit to allow a complete differential operation between the front wheel rotary shaft and the rear wheel rotary shaft achieved so that the front wheel rotary shaft and the rear wheel rotary shaft are allowed to rotate freely with each other.

When the differential restriction degree is set to the first degree, the differential operation (relative rotation) between the front wheel rotary shaft and the rear wheel rotary shaft is fully allowed. In other words, for example, when the differential restriction degree is set to the first degree, the differential restriction between the front wheel rotary shaft and the rear wheel rotary shaft is completely released/canceled. Further, in other words, when the differential restriction degree is set to the first degree, a coupling torque of the center differential device is "0". The thus configured present invention device performs (carries out) the EBD control, when the required braking force becomes large so that the slip ratio of the rear wheels becomes higher than the slip ratio of the front wheels while the differential restriction degree has been set at the first degree. Consequently, the present invention device can decrease the braking force distribution ratio of the braking force of the rear wheels to the braking force of the front wheels.

Meanwhile, for example, there are cases where the differential restriction control unit sets the differential restriction degree to a second degree in accordance with a request of the driver, a driving state, and the like. When the differential restriction degree is set to the second degree, the differential operation (relative rotation) between the front wheel rotary shaft and the rear wheel rotary shaft are not allowed (prohibited). In other words, for example, when the differential restriction degree is set to the second degree, the differential restriction between the front wheel rotary shaft and the rear wheel rotary shaft is maximized. Further, in other words, when the differential restriction degree is set to the second degree, a coupling torque of the center differential device is a maximum torque.

When the differential restriction degree is set to the second degree, the braking force of the front wheels is prevented from being excessive, and thus, an under steering tendency due to a shortage of the lateral force of the front wheels during braking of the vehicle is prevented. In this state, the braking force of the front wheels and the braking force of the rear wheels vary in accordance with the ideal distribution ratio which is a ratio obtained when the slip ratio of the front wheels is equal to the slip ratio of the rear wheels. However, in a region where a requested braking force is large, the traveling stability of the vehicle degrades since the braking force of the rear wheels becomes excessive so that the lateral force which the rear wheels are able to generate decreases. In this case, if the differential restriction degree is held at the second degree, the slip ratio of the front wheels and the slip ratio of the rear wheels coincide with each other. Consequently, the above-mentioned EBD control cannot be executed.

In view of the above, the differential restriction control unit is configured to:
  determine whether a specific state has occurred, the specific state being a state where it is likely that a situation occurs where the slip ratio of the rear wheels is larger than the slip ratio of the front wheels under the assumption that the differential restriction degree is set to the first degree, when the differential restriction control unit sets the differential restriction degree at the second degree (Tcu=Tcumax) to prohibit the differential operation (Step 560, Step 745, Step 918, Step 1010, and Step 1020); and
  change the differential restriction degrees from the second degree to the first degree when it is determined that the specific state has occurred (Step 590, Step 765, and Step 934).

Thus, according to the above configuration, when it is determined that the specific state has occurred in a period in which the differential restriction degree is set at the second degree, the differential restriction degree is changed to the first degree to realize/achieve a state where the slip ratio of the rear wheels is larger than the slip ratio of the front wheels. Accordingly, the execution of the EBD control is allowed. Consequently, the EBD control is executed, so that the braking force of the rear wheels is held at a certain value. Therefore, the braking force of the rear wheels does not increase even if the required braking force increases. As a result, the present invention device can prevent the lateral force of the rear wheels from excessively decreasing due to the increase of the braking force of the rear wheels, to secure the traveling stability of the vehicle.

In one of the embodiments of the control device for a four-wheel drive vehicle according to the present invention, the differential restriction control unit is configured to determine that the specific state has occurred (Step 560: No), when a condition that a vehicle body speed at a start of braking by the braking device is equal to or higher than a predetermined vehicle body speed threshold (Vbrk≥Vth) becomes satisfied.

A braking force required to reduce the vehicle body speed is larger, as the vehicle body speed at the start of braking is higher. Therefore, the predetermined vehicle body speed threshold (Vth) is determined in advance to be a certain vehicle body speed at the start of braking, in consideration of the following. That is, if the vehicle body speed (Vbrk) at the start of braking is higher than the predetermined vehicle body speed threshold (Vth), it can be presumed that a "situation where a braking force is required, the braking force being necessary to have the slip ratio of the rear wheels higher than the slip ratio of the front wheels assuming that the vehicle travels in a state where the differential restriction is released " is likely to occur. Accordingly, it can be determined that the specific state has occurred when the condition that the vehicle body speed at the start of braking is equal to or higher than the predetermined vehicle body speed threshold is satisfied.

In one of the embodiments of the control device for a four-wheel drive vehicle according to the present invention, the differential restriction control unit is configured to determine that the specific state has occurred (Step 1010: No) when a condition that a braking request value by a driver of the vehicle is equal to or larger than a predetermined braking request threshold becomes satisfied (Pm≥Pmth).

A generated braking force becomes higher, as a braking request value by the driver (e.g. a master cylinder pressure, a braking pedal depression amount, and the like) becomes larger. Therefore, the predetermined braking request threshold (Pmth) is determined in advance to be a certain braking request value, in consideration of the following. That is, if the braking request value is equal to or larger than the predetermined braking request threshold, a braking force is required, the braking force being necessary to have the the slip ratio of the rear wheels higher than the slip ratio of the front wheels assuming that the vehicle travels in a state where the differential restriction is released. Accordingly, it can be determined that the specific state has occurred when the condition that the braking request value is equal to or larger than the predetermined braking request threshold is satisfied.

In one of the embodiments of the control device for a four-wheel drive vehicle according to the present invention, the differential restriction control unit is configured to determine that the specific state has occurred (Step 1020: No) when a condition that a magnitude of a deceleration of the vehicle is equal to or larger than a predetermined deceleration threshold (Gx≤−gth) becomes satisfied.

It is presumed that a generated braking force becomes higher, as a magnitude of the deceleration of the vehicle becomes larger. Therefore, the predetermined deceleration threshold (−gth) is determined in advance to be a certain deceleration, in consideration of the following. That is, if the magnitude of the deceleration of the vehicle is equal to or larger than the predetermined deceleration threshold, a braking force is generated, the braking force being necessary to have the slip ratio of the rear wheels higher than the slip ratio of the front wheels assuming that the vehicle travels in a state where the differential restriction is released. Accordingly, it can be determined that the specific state has occurred when the condition that the magnitude of the deceleration of the vehicle is equal to or larger than the predetermined deceleration threshold is satisfied.

In one of the embodiments of the control device for a four-wheel drive vehicle according to the present invention, the differential restriction control unit is configured to change the differential restriction degree to a third degree which is larger than the first degree and is smaller than the second degree (Step 932, Step 920: No, Step 936, Step 938) when a deviation (Vwr−Vwf) between a wheel speed of the rear wheels and a wheel speed of the front wheels exceeds a predetermined deviation (Δth) (Step 930: Yes) in a case where the differential restriction degree is changed from the second degree to the first degree (Step 928).

In the description given above, in order to facilitate understanding of the present invention, names and/or reference symbols used in an embodiment of the present invention described below are enclosed in parentheses, and are assigned to elements of the invention corresponding to the embodiment. However, the respective elements of the present invention are not limited to the embodiment defined by the names and/or the reference symbols. Other objects, other features, and accompanying advantages of the present invention are readily understood from a description of the embodiment of the present invention to be given referring to the following drawings.

DESCRIPTION OF THE EMBODIMENTS

First Embodiment (Configuration)

Figure 1:
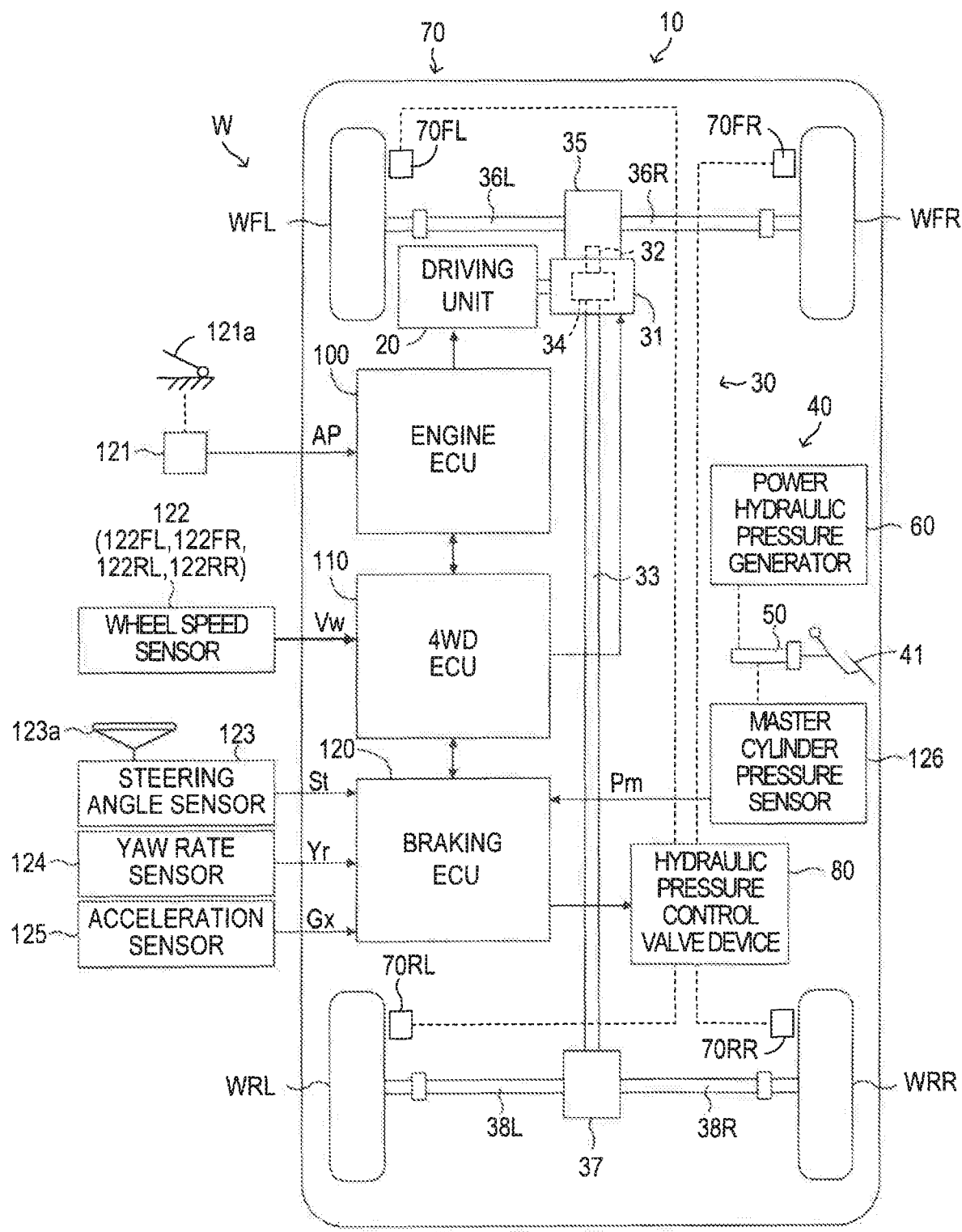
FIG. 1 is a schematic diagram for illustrating a control device for a four-wheel drive vehicle according to a first embodiment of the present invention.

A control device (hereinafter referred to as "first control device") for a four-wheel drive vehicle according to a first embodiment of the present invention is applied to a four-wheel drive vehicle (hereinafter simply referred to as "vehicle") 10, as illustrated in FIG. 1.

The vehicle 10 comprises a driving device 20 which generates a driving force for the vehicle, a driving force transmission mechanism 30, a braking device 40, an engine ECU 100, a 4WD ECU 110, a braking ECU 120, and the like. It should be noted that two or more of those ECUs may be integrated into one ECU.

The ECU is an abbreviated word for an electronic control unit, and is an electronic control circuit including, as a main component, a microcomputer including a CPU, a ROM, a RAM, a backup RAM (or a nonvolatile memory), an interface, and the like. The CPU is configured to execute instructions (routines) stored in the memory (ROM) to implement various functions described later.

Specifically, the driving device 20 generates a driving force for driving wheels (the front left wheel WFL, the front right wheel WFR, the rear left wheel WRL, and the rear right wheel WRR) of the vehicle 10 via the driving force transmission mechanism 30. The driving device 20 may be any type of a driving device for a vehicle known in the art, such as a combination of an internal combustion engine and a transmission of a conventional vehicle, a combination of an electric motor and a transmission, a hybrid system which is a combination of an internal combustion engine, an electric motor and a transmission, or the like.

The driving force transmission mechanism 30 includes a center differential device 31, a front wheel rotary shaft 32, a rear wheel rotary shaft 33, a differential restriction/limiting device 34, a front wheel differential gear 35, a front left wheel axle 36L, a front right wheel axle 36R, a rear wheel differential gear 37, a rear left wheel axle 38L, a rear right wheel axle 38R, and the like.

The center differential device 31 is configured to transmit the driving force from the driving device 20 to the front wheel rotary shaft 32 and the rear wheel rotary shaft 33 (a propeller shaft) 33, and to allow a difference (differential) between a rotation speed of the front wheel rotary shaft 32 and a rotation speed of the rear wheel rotary shaft 33 (or to allow a differential operation between the front wheel rotary shaft 32 and the rear wheel rotary shaft 33, or to allow the front wheel rotary shaft 32 and the rear wheel rotary shaft 33 to rotate freely with each other). In the present embodiment, the center differential device 31 includes an electrically controlled differential restriction device 34.

The differential restriction device 34 varies a mutual restraining force between the front wheel rotary shaft 32 and the rear wheel rotary shaft 33 using the center differential device 31. Thus, the differential restriction device 34 has a function to control a differential restriction degree between the front wheel rotary shaft 32 and the rear wheel rotary shaft 33. The mutual restraining force between the front wheel rotary shaft 32 and the rear wheel rotary shaft 33 (that is, a coupling torque Tcu of the center differential device 31) is controlled by the 4WD ECU 110 as will be described in detail later.

The driving force of the front wheel rotary shaft 32 is transmitted to the front left wheel axle 36L and the front right wheel axle 36R through the front wheel differential gear 35, whereby the front left wheel WFL and the front right wheel WFR are rotationally driven. Similarly, the driving force of the rear wheel rotary shaft 33 is transmitted to the rear left wheel axle 38L and the rear right wheel axle 38R through the rear wheel differential gear 37, whereby the rear left wheel WRL and the rear right wheel WRR are rotationally driven.

Figure 2:
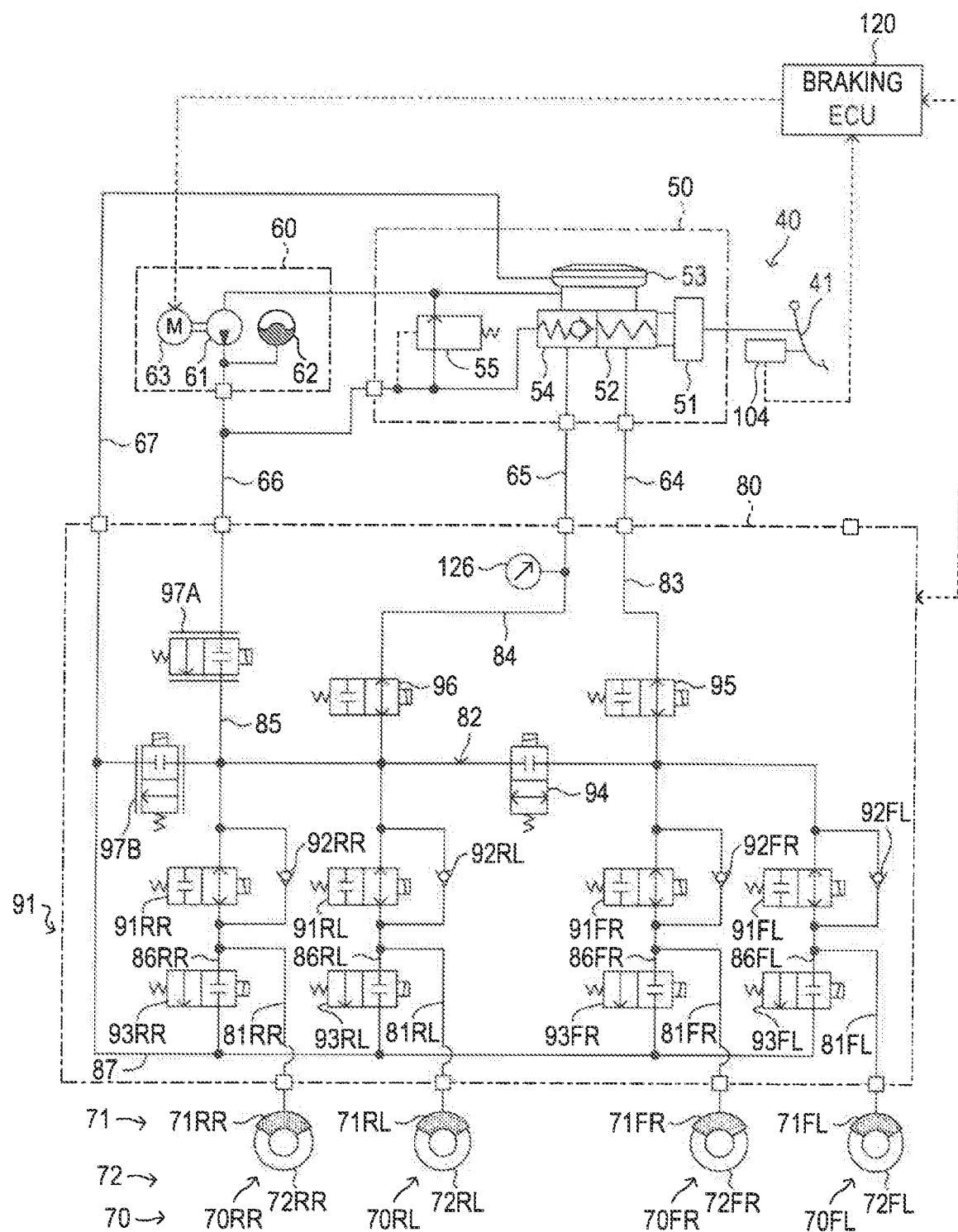
FIG. 2 is a schematic diagram for a braking device illustrated in FIG. 1.

As shown in FIG. 2, the braking device 40 includes a brake pedal 41, a master cylinder unit 50, a power hydraulic pressure generator 60, a braking unit 70, hydraulic pressure control valve device 80, and the like.

The master cylinder unit 50 includes a hydraulic pressure booster 51, a master cylinder 52, a reservoir 53, a regulator 54, and a relief valve 55. The master cylinder unit 50 is a well-known master cylinder unit described, for example, in Japanese Patent Application Laid-open (Kokai) No. 2013-49292 and No. 2013-256253.

The power hydraulic pressure generator 60 is a power source for a hydraulic pressure, which includes a pump 61, an accumulator 62 and a motor 63. The power hydraulic pressure generator 60 is a well-known power hydraulic pressure generator described, for example, in Japanese Patent Application Laid-open (Kokal) No. 2013-49292 and No. 2013-256253.

The braking unit 70 is provided for each of the wheels, and includes a wheel cylinder 71 and a brake disk 72. Note that, for the elements provided for each of the wheel, a suffix FL for representing the front left wheel, a suffix FR for representing the front right wheel, a suffix RL for representing the rear left wheel, and a suffix RR for representing the rear right wheel are attached to the end of the reference numeral. However, when a wheel position does not need to be specified for the elements provided for each of the wheels, those suffixes are omitted.

The wheel cylinders 71FL, 71FR, 71RL, and 71RR press brake pads to brake disks 72FL, 72FR, 72RL, and 72 RR, respectively, using the hydraulic pressure of hydraulic fluid which is supplied from the hydraulic pressure control valve device 80. The brake disks 72FL, 72FR, 72RL, and 72RR rotate with the wheels WFL, WFR, WRL, and WRR, respectively. In this manner, the wheel cylinder 71 applies a braking force to the wheel W.

The hydraulic control valve device 80 includes four separate passages 81FL, 81FR, 81RL, and 81RR respectively connected to the wheel cylinders 71FL, 71FR, 71RL, and 71RR, a main passage 82 which communicates among the separate passages 81FL, 81FR, 81RL, and 81RR, a master passage 83 which connects the main passage 82 and a master pipe 64, a regulator passage 84 which connects the main passage 82 and a regulator pipe 65, an accumulator passage 85 which connects the main passage 82 and an accumulator pipe 66. The master passage 83, the regulator passage 84 and the accumulator passage 85 are respectively connected in parallel to the main passage 82.

ABS holding valves 91 (91FL, 91FR, 91RL, and 91RR) are interposed in the separate passages 81FL, 81FR, 81RL, and 81RR, respectively. The ABS holding valve 91 is a normally open two-position solenoid valve which alternatively selects either a communication position or a shut-off position. Thus, the ABS holding valves 91FL, 91FR, 91RL, and 91RR respectively communicate the separate passages 81FL, 81FR, 81RL, and 81RR when the communication position is selected, and respectively shut off the separate passages 81FL, 81FR, 81RL, and 81RR when the shut-off position is selected, Return check valves 92FL, 92FR, 92RL, and 92RR are respectively provided in parallel to the ABS holding valves 91FL, 91FR, 91RL, and 91RR in the separate passages 81FL, 81FR, 81RL, and 81RR. The return check valve 92 is the valve which shuts off a flow of the hydraulic fluid from the main passage 82 to the wheel cylinder 71 and allows a flow of the hydraulic fluid from the wheel cylinder 71 to the main passage 82.

Separate passages for pressure reduction 86FL, 86FR, 86RL, and 86RR are respectively connected to the separate passages 81FL, 81FR, 81RL, and 81RR. The separate passages for pressure reduction 86 are connected to a reservoir-passage 87. The reservoir passage 87 is connected to the reservoir 53 via a reservoir pipe 67. ABS reducing valves 93FL, 93FR 93RL, and 93RR are interposed in the separate passages for pressure reduction 86FL, 86FR, 86RL, and 86RR, respectively. The ABS reducing valve 93 is a normally closed two-position solenoid valve which alternatively selects either the communication position or the shut-off position. Thus, the ABS reducing valves 93FL, 93FR, 93RL, and 93RR respectively communicate the separate passages for pressure reduction 86FL, 86FR 86RL, and 86RR when the communication position is selected, and respectively shut off the separate passages for pressure reduction 86FL, 86FR, 86RL, and 86RR when the shut-off position is selected.

When the wheels locks to slip, the ABS holding valve 91 and the ABS reducing valve 93 is controlled when an anti-skid control which prevents the wheel from locking by reducing the wheel cylinder pressure and an EBD control are executed.

A communication valve 94 is provided in the middle of the main passage 82. A master cut valve 95 is provided in the middle of the master passage 83. A regulator cut valve 96 is provided in the middle of the regulator passage 84. A pressure boosting linear control valve 97A is provided in the middle of the accumulator passage 85. Further, the main passage 82 which is connected to the accumulator passage 85 is connected to the reservoir passage 87 via the pressure reducing linear control valve 97B. Such a configuration is well known and described in Japanese Patent Application Laid-open (Kokai) No. 2013-49292 and No. 2013-256253 for example. These are incorporated herein by reference.

The master cylinder pressure sensor 126 is provided on the upstream side from the regulator cut valve 96 in the regulator passage 84. The master cylinder pressure sensor 126 detects the hydraulic pressure of the hydraulic fluid on the upstream side from the regulator cut valve 96, that is, the hydraulic pressure of the hydraulic fluid supplied from the master cylinder unit 50 to the hydraulic pressure control valve device 80 as a master cylinder pressure Pm.

Referring back to FIG. 1, the engine ECU 100 is connected to the 4WD ECU 110 described later and the braking ECU 120 described later so as to be capable of exchanging information via CAN (Controller Area Network) communication to and from those ECUs. The engine ECU 100 is electrically connected to an accelerator opening sensor 121, or the like. The engine ECU 100 is configured to receive output signals from those sensors. The accelerator opening sensor 121 is configured to generate output signal indicative of an operating amount AP of an accelerator pedal 121a which is provided so as to be operable by a driver. The engine ECU 100 is configured to make the driving device 20 generate the driving force based on the signals from the accelerator opening sensor 121 or the like.

The 4WD ECU 110 is electrically connected to wheel speed sensors 122 (122FL, 122FR, 122RL, and 122RR), or the like. The 4WD ECU 110 is configured to receive output signals from those sensors. The wheel speed sensors 122FL, 122FR, 122RL, and 122RR are configured to generate output signals indicative of a wheel speed Vwfl of the front left wheel WFL, a wheel speed Vwfr of the front right wheel WFR, a wheel speed Vwrl of the rear left wheel WRL, and a wheel speed Vwrr of the rear right wheel WRR, respectively.

The 4WD ECU 110 controls the coupling torque Tcu of the differential restriction device 34. The differential restriction device 34 allows a full (complete) relative rotation between the front wheel rotary shaft 32 and the rear wheel rotary shaft 33 when the coupling torque Tcu is set to be zero, and does not allow any relative rotation (i.e., it prohibits a relative rotation) between the front rotary shaft 32 and the rear rotary shaft 33 when the coupling torque Tcu is set to a maximum value Tcumax. Further, when the coupling torque Tcu is set to be a value between 0 and the maximum value Tcumax, the differential restriction device 34 gradually raises the differential restriction degree between the front rotary shaft 32 and the rear rotary shaft 33 as the coupling torque Tcu becomes larger.

Therefore, the coupling torque Tcu is an index value indicating the differential restriction degree of the differential restriction device 34. Setting the differential restriction degree means setting a value of the coupling torque Tcu.

The braking ECU 120 is electrically connected to a steering angle sensor 123, a yaw rate sensor 124, an acceleration sensor 125, a master cylinder pressure sensor 126, or the like. The braking ECU 120 is configured to receive output signals from those sensors. The steering angle sensor 123 is configured to generate output signal incicative of a steering angle St of the steering wheel 123a which is provided so as to be operable by the driver. The yaw rate sensor 124 is configured to generate output signal indicative of a yaw rate Yr of the vehicle 10. The acceleration sensor 125 is configured to generate output signal indicative of an acceleration/deceleration Gx of the vehicle 10. The master cylinder pressure sensor 126 is configured to generate output signal indicative of the master cylinder pressure Pm. It should be noted that the steering angle St detected by the steering angle sensor 123 and the yaw rate Yr detected by the yaw rate sensor 124 are positive, when vehicle 10 is turning leftward.

The braking ECU 120 calculates a target braking force Fbf1t of the front left wheel WFL, a target braking force Fbfrt of the front right wheel WFR, a target braking force Fbrlt of the rear left wheel WRL, and a target braking force Fbrrt of the rear right wheel WRR, based on the master cylinder pressure Pm. The braking ECU 120 adjusts the braking pressures of the wheel cylinders 71FL, 71FR, 71RL, and 71RR by controlling the pressure boosting linear control valve 97A and the pressure reducing linear control valve 97B in such a manner that each of the braking forces becomes equal to each of the corresponding target braking forces.

(Operation)

Figure 3:
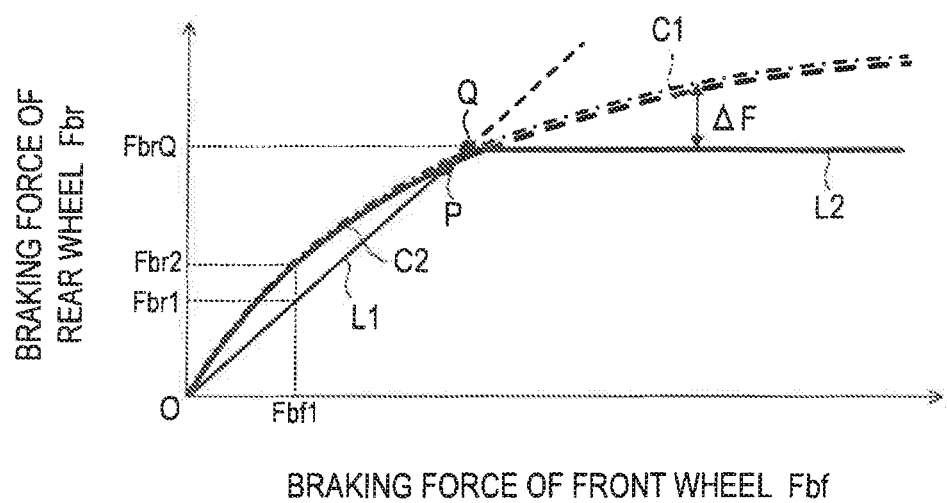
FIG. 3 is a diagram for explaining a distribution ratio between a braking force of front wheels and a braking force of rear wheels of the braking device illustrated in FIG. 1.

Hereinafter, operation of the first control device will be described with reference to FIG. 3. A curved line C1 shown in FIG. 3 represents a relationship between the braking force Fbf of the front wheels and the braking force Fbr of the rear wheels when they vary in accordance with the ideal distribution ratio. A straight line L1 and a straight line L2 represent a relationship between the braking force Fbf of the front wheels and the braking force Fbr of the rear wheels when the coupling torque Tcu of the center differential device 31 is set to "0". Hereinafter, setting the coupling torque Tcu is to "0" is expressed as setting the differential restriction degree between the front rotary shaft 32 and the rear rotary shaft 33 to a first degree. Further, a travelling mode of the vehicle 10 when the coupling torque Tcu is set to "0" is referred to as "two-wheel driving mode".

As understood from the straight fine L1, in the two-wheel driving mode, the braking force Fbf of the front wheels and the braking force Fbr of the rear wheels are adjusted so as to vary with keeping a proportional relationship with each other when a sum of the braking force Fbf of the front wheels and the braking force Fbr of the rear wheels (hereinafter referred to as "vehicle required braking force") is small. In this situation, the braking force Fbr1 of the rear wheels with respect to the braking force Fbf1 of the front wheels is adjusted so as to be smaller than a braking force Fbr2 determined according to the ideal distribution ratio.

Meanwhile, a braking slip ratio SLf of the front wheels and a braking slip ratio SLr of the rear wheels are equal to each other, when the braking force Fbf of the front wheels and the braking force Fbr of the rear wheels vary in accordance with the ideal distribution ratio. The braking slip ratio SL (SLf, SLfr) is defined as a ratio of a deviation (difference) between a vehicle body speed Vb and a wheel speed Vw to the vehicle body speed Vb. Hereinafter, the braking slip ratio SL is also simply referred to as "slip ratio SL" The braking slip ratio SLf of the front wheels is also simply referred to as "front wheel slip ratio SU". The braking slip ratio SLr of the rear wheels is also simply referred to as "rear wheel slip ratio SLr". Generally, the vehicle body speed Vb cannot be detected. Thus, an estimated vehicle body speed Vx estimated based on the wheel speed Vw of each of the wheels is used to calculate the slip ratio SL in place of the vehicle body speed Vb, In other words, the slip ratio SL is calculated according to the following equation.

$$SL=(Vx-Vw)/Vx \quad (1)$$

For example, the highest wheel speed Vwi among the four wheel speeds Vwi (Vwfl, Vwfr, Vwrl, and Vwrr) is selected every time a predetermined sampling time elapses as the estimated vehicle body speed Vx.

The above mentioned front-rear braking force distribution ratio (an inclination of the straight line L1 shown in FIG. 3) is determined depending on which one of a braking performance and a travelling stability performance of the vehicle is prioritized. In other words, there is a trade-off relationship between the braking performance of the vehicle and the travelling stability performance of the vehicle. When the travelling stability performance of the vehicle is heavily weighed, the braking distribution ratio of the braking force of the rear wheels to the braking force of the front wheels is set to be low, and thus, the inclination of the straight line L1 is small. On the other hand, when the braking performance of the vehicle is heavily weighed, the braking distribution ratio comes closer to the ideal distribution ratio, and thus, the inclination of the straight line L1 is large.

The curved line C1 representing the ideal distribution ratio is a curve whose inclination becomes smaller as the braking force (vehicle required braking force) increases. The curved line C1 intersects with the straight line L1 (refer to a point P shown in FIG. 3) representing the braking distribution ratio of the braking force of the rear wheels to the braking force of the front wheels. For example, when the brake operation is performed so that the braking force is generated in the two-wheel driving mode, the braking force increases along the straight line L1 of the braking distribution ratio from origin O shown in FIG. 3. In this example, the rear wheel slip ratio SLr is smaller than the front wheel slip ratio SLf (SLr<SLf) while the braking force increases (along the straight line L1) from the origin O to the point P. The rear wheel slip ratio SLr becomes equal to the front wheel slip ratio SLf at the point P (SLr=SLf), and the rear wheel slip ratio SLr becomes larger than the front wheel slip ratio SLf (SLr>SLf) if the braking force increases beyond the point P. A point Q shown in FIG. 3 is an example of the point beyond the point P.

An EBD control execution condition is satisfied at the point Q at which the rear wheel slip ratio SLr becomes larger than the front wheel slip ratio SLf. When the EBD control starts to be executed at the point Q, the positions of the ABS pressure holding valves for the rear wheels 91RL and 91RR and the positions of the ABS pressure reducing valves for rear wheels 93RL and 93RR are changed (switched) to the shut-off positions, so that the pressure of the wheel cylinder for the rear wheels 71RL and 71RR are held. Consequently, the braking force of the rear wheels remains unchanged even if the braking force of the front wheels varies. Thus, the braking distribution ratio changes in parallel with the horizontal axis as shown by the straight line L2 in FIG. 3. Accordingly, a difference ΔF shown in FIG. 3 increases as the braking force of the front wheels increases. The difference ΔF is a difference between the braking force of the front wheels on the curved line C1 representing the ideal distribution ratio and the braking force of the front wheels on the straight line L2 representing the braking force distribution ratio while the EBD control is performed. In other words, the braking force of the rear wheels is kept at a value FbrQ corresponding to the point Ct so that the lateral force of the rear wheels is secured even when the braking force of the front wheels increases. Therefore, the EBD control allows the "vehicle which operates along the straight line L1 whose inclination is large by heavily weighing the braking performance" to secure the travelling stability performance.

In the present specification, a "control to maintain the braking force of the rear wheels at a constant value when the braking force of the front wheels increases" as in the above manner is referred to as "EBD control". According to the EBD control, the braking force Fbr of the rear wheels is controlled so as to be smaller than the "braking force of the rear wheels determined based on the ideal distribution ratio and the braking force Fbf of the front wheels".

On the other hand, when the vehicle travels in a state where the coupling torque Tcu of the center differential device 31 is set to the maximum value Tcumax, the front wheels and the rear wheels rotate at the substantially same speed as each other so that the rear wheel slip ratio SLr and the front wheel slip ratio SLf are equal to each other, since the front wheels and the rear wheels are restrained to each other. Hereinafter, setting the coupling torque Tcu to the maximum coupling torque Tcumax is expressed as setting the differential restriction degree between the front rotary shaft 32 and the rear rotary shaft 33 to a second degree. Further, a travelling mode of the vehicle 10 when the coupling torque Tcu is set to the maximum coupling torque Tcumax is referred to as "four-wheel driving mode".

As described above, when the travelling mode of the vehicle 10 is set to the four-wheel driving mode, the rear wheel slip ratio SLr is substantially equal to the front wheel slip ratio SU Therefore, the braking force Fbf of the front wheels and the braking force Fbr of the rear wheels increase along the curved line C1. Thus, in the four-wheel driving mode, the above-mentioned EBD control execution condition is not satisfied/established since the rear wheel slip ratio SLr does not become larger than the front wheel slip ratio SLf even when the braking force Fbf of the front wheels increases beyond the value corresponding to the point P described above. Thus, in the four-wheel driving mode, the above-mentioned EBD control is not performed. Consequently, it is difficult to secure the travelling stability performance, due to a lack of the lateral force which the rear wheels can generate.

In view of the above, when a request for braking (a braking operation) by the driver is generated in a case where the first control device sets the differential restriction degree to the second degree (that is, a case where the vehicle 10 is travelling in the four-wheel driving mode), the first control device determines whether a specific state has occurred where it is determined that the EBD control should be performed. The specific state is a driving state where it is likely that a situation occurs where the slip ratio SLr of the rear wheels is larger than the slip ratio SLf of the front wheels under the assumption that the differential restriction degree is set to the first degree (that is, when it is assumed that the vehicle 10 is travelling in the two-wheel driving mode).

The specific state adopted by the first control device is a state where the vehicle body speed Vbrk at a start of braking is higher than a predetermined vehicle body speed threshold Vth. The reason for this is as follows. A required braking force to reduce the vehicle body speed is higher as the vehicle body speed Vbrk at the start of braking is higher. Thus, when the vehicle body speed Vbrk at the start of braking is higher than the predetermined vehicle body speed threshold Vth, a braking force corresponding to the point P or higher is generated. Consequently, if the vehicle 10 is travelling in the two-wheel driving mode, the rear wheel slip ratio SLr is very likely to become larger than the front wheel slip ratio SLf.

When the first control device determines that the "specific state" has occurred, the first control device changes the travelling modes of the vehicle 10 from the four-wheel driving mode to the two-wheel driving mode by changing the coupling torque Tcu of the center differential device 31 from the "maximum value Tcumax" to "0". In other words, the first control device changes the differential restriction degrees from the second degree to the first degree.

The braking force Fbf of the front wheels and the braking force Fbr of the rear wheels are increased along the straight line L1 instead of the curved line C1 from the start of braking. When the braking force Fbf of the front wheels and the braking force Fbr of the rear wheels reach respective values corresponding to the point Q, the first control device starts to perform the above-mentioned EBD control. That is, the first control device starts to keep the braking force of the rear wheels at the constant value FbrQ corresponding to the point Q. Thus, the braking force Fbf of the front wheels and the braking force Fbr of the rear wheels vary along the straight line L2.

In the above manner, when the braking is started in the case where the vehicle is travelling in the four-wheel driving mode, the first control device makes the vehicle travel in the two-wheel driving mode if the vehicle body speed Vbrk is higher than the predetermined vehicle body speed threshold Vth. Therefore, the first control device realizes/achieves a state where the EBD control execution condition that the rear wheel slip ratio SLr is higher than the front wheel slip ratio SLf can be satisfied. When the EBD control execution condition is actually satisfied, the first control device performs the EBD control. Consequently, the first control device can secure the travelling stability of the vehicle 10. It should be noted that the "EBD control which starts to be performed when the EBD control execution condition that the rear wheel slip ratio SLr is higher than the front wheel slip ratio SLf is satisfied" is referred to as "normal EBD control" to distinguish it from a "quick-depression EBD control" described later.

<ABS Control>

Figure 4:
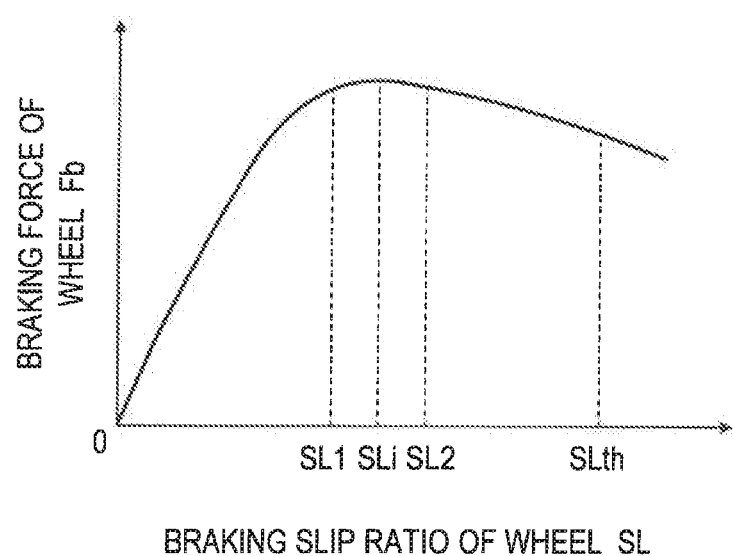
FIG. 4 is a diagram for explaining a relationship between a braking slip ratio and a braking force of the braking device illustrated in FIG. 1.

As shown in FIG. 4, when the slip ratio SL is equal to or lower than a predetermined slip ratio (hereinafter also referred to as "ideal slip ratio") SLi which is determined mainly by characteristic of a tire, the braking force of the wheel increases as the slip ratio SL increases. When the slip ratio SL is higher than the ideal slip ratio SLi, the braking force of the wheel decreases as the slip ratio SL increases. The braking ECU 120 calculates the slip ratio SL of each of the wheels based on the wheel speeds Vwfl, Vwfr, Vwrl, and Vwrr to perform/execute anti-skid control (hereinafter referred to as "ABS control") known in the art.

The ABS control is performed, for example, in such a manner that the hydraulic pressure of the hydraulic fluid supplied to each of the wheels is adjusted through the braking device 40 so that the slip ratio SL of each of the wheels comes closer to the ideal slip ratio SLi. More specifically, when the slip ratio SL of a certain wheel of the wheels exceeds a predetermined slip ratio threshold SLth larger than the ideal slip ratio SLi, the hydraulic pressure for that certain wheel is adjusted by the braking device 40 so that the slip ratio SL of that certain wheel falls within a range from SL1 to SL2 which is a minute range including the ideal slip ratio SLi. A period for which the hydraulic pressure is adjusted in the above manner is an execution period of the ABS control.

(Specific Operation of First Control Device)

Figure 5:
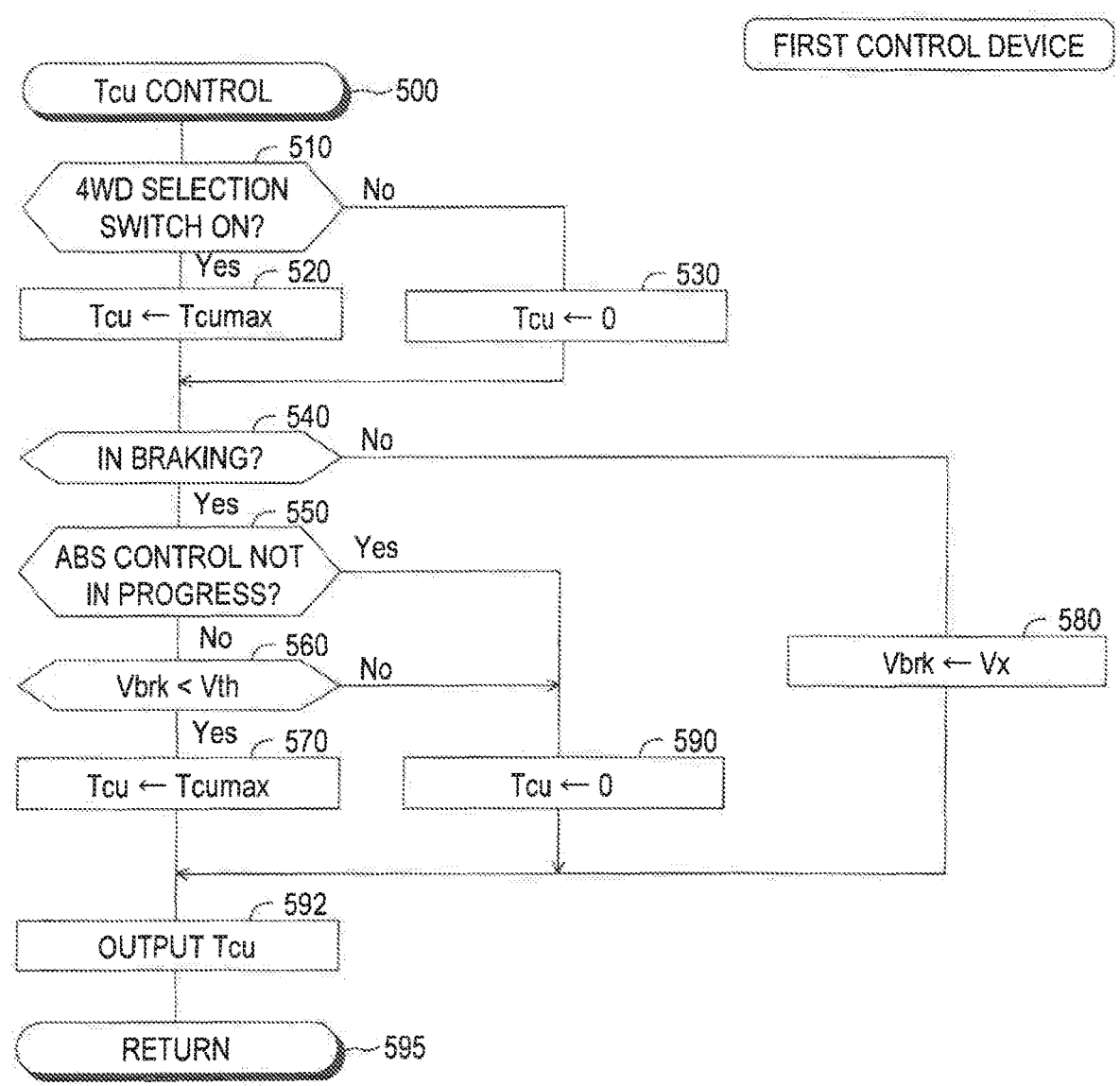
FIG. 5 is a flowchart for illustrating a "coupling torque control routine" executed by a CPU of a 4WD ECU illustrated in FIG. 1.

Hereinafter, actual operations of the first control device will be described with reference to FIG. 5. The CPU of the 4WD ECU 110 is configured to execute a coupling torque control routine illustrated by a flowchart of FIG. 5 every time a constant time elapses. The coupling torque Tcu is set to "0" in an initialization routine which is separately executed when an ignition key switch is turned on.

The CPU starts the process from Step 500 at a certain time point to proceed to Step 510 at which the CPU determines whether a 4WD selection switch (not shown) is set at ON (on-state) by a driver of the vehicle. When the 4WD selection switch is ON, the CPU makes a "Yes" determination at Step 510 to proceed to Step 520, at which the CPU sets the coupling torque Tcu to the maximum value Tcumax to proceed to Step 540. In contrast, when the 4WD selection switch is set at OFF (off-state), the CPU makes a "No" determination at Step 510 to proceed to Step 530, at which the CPU sets the coupling torque Tcu to "0" to proceed to Step 540.

Subsequently, the CPU determines whether the braking is being operated at Step 540. More specifically, the CPU determines whether the master cylinder pressure Pm is equal to or higher than a predetermined value Pmth1.

When the master cylinder pressure Pm is neither equal to nor higher than the predetermined value Pmth1 (that is, when the braking is not being operated), the CPU makes a "No" determination at Step 540 to proceed to Step 580, at which the CPU estimates the vehicle body speed Vx based on the wheel speeds Vw of the wheels as in the manner described above. Specifically, the CPU selects a maximum wheel speed among the wheel speeds Vw of the wheels, as the vehicle body speed Vx. The CPU stores, as a vehicle body speed Vbrk at the start of braking, the vehicle body speed Vx into the RAM. Subsequently, the CPU proceeds to Step 592 to control the differential restriction device 34 in such a manner that the actual coupling torque agrees with (or becomes equal to) the set coupling torque Tcu, and proceeds to Step 595 to tentatively terminate the present routine.

On the other hand, when the braking is being operated at the time point at which the CPU executes the process of Step 540, the CPU makes a "Yes" determination at Step 540 to proceed to Step 550, at which the CPU determines whether the anti-skid (ABS) control is not being performed. When the ABS control is being performed, it is desirable to have the differential restriction device 34 release/stop the differential restriction so as to control/adjust each of the slip ratios of the wheels separately/independently. In view of the above, when the ABS control is being performed, the CPU makes a "negative" determination at Step 550 to proceed to Step 590, at which the CPU sets the coupling torque Tcu to "0". Subsequently, the CPU proceeds to Step 592 to control the differential restriction device 34 in such a manner that the actual coupling torque agrees with (or becomes equal to) the set coupling torque Tcu, and proceeds to Step 595 to tentatively terminate the present routine.

On the other hand, when the ABS control is not being performed, the CPU makes an "affirmative" determination at Step 550 to proceed to Step 560, at which the CPU determines whether the vehicle body speed Vbrk at the start of braking is lower than the predetermined vehicle body speed threshold Vth.

When the vehicle body speed Vbrk at the start of braking is lower than the predetermined vehicle body speed threshold Vth, the CPU makes a "Yes" determination at Step 560 to proceed to Step 570, at which the CPU sets the coupling torque Tcu to the maximum value Tcumax. That is, the CPU sets the travelling mode of the vehicle to the four-wheel driving mode. Subsequently, the CPU proceeds to Step 592, at which the CPU controls the differential restriction device 34 in such a manner that the actual coupling torque agrees with (or becomes equal to) the set coupling torque Tcu, and proceeds to Step 595 to tentatively terminate the present routine.

When the vehicle body speed Vbrk at the start of braking is equal to or higher than the predetermined vehicle body speed threshold Vth, the CPU makes a "No" determination at Step 560 to proceed to Step 590, at which the CPU sets the coupling torque to "0". Subsequently, the CPU proceeds to Step 592, at which the CPU controls the differential restriction device 34 in such a manner that the actual coupling torque agrees with (or becomes equal to) the set coupling torque Tcu, and proceeds to Step 595 to tentatively terminate the present routine.

In this manner, when the vehicle body speed Vbrk at the start of braking is equal to or higher than the predetermined vehicle body speed threshold Vth in the case where the braking of the vehicle 10 is being executed and the ABS control is not being performed, the CPU sets the coupling torque Tcu to "0" to release/cancel the differential restriction. When the vehicle body speed Vbrk at the start of braking is equal to or higher than the predetermined vehicle body speed threshold Vth, the rear wheel slip ratio SLr is likely to become higher than the front wheel slip ratio SLf (in other words, the EBD control execution condition is likely to be satisfied if the travelling mode of the vehicle 10 is the two-wheel driving mode).

As described above, when the first control device sets, using the differential restriction device 34, the differential restriction degree to the second degree, the first control device determines whether the specific state has occurred, the specific state being the state where it is likely that a situation occurs where the rear wheel slip ratio SLr is larger than the front wheel slip ratio SLf under the assumption that the differential restriction degree is set to the first degree. The first control device changes the differential restriction degrees from the second degree to the first degree when it determines that the specific state has occurred.

Thus, even when the vehicle required braking force becomes large in a state where the differential restriction degree between the front wheel rotary shaft and the rear wheel rotary shaft is high, the EBD control can be executed. Thereby, the first control device can prevent the lateral force of the rear wheels from excessively decreasing due to an excessive increase in the braking force of the rear wheels. Consequently, the travelling stability of the vehicle is secured.

It may be determined that the specific state described above has occurred, not only when the vehicle body speed Vbrk at the start of braking is larger than the predetermined vehicle body speed threshold Vth, but also when, for example, the required value for braking (vehicle required braking force) by the driver of the vehicle (for example, the master cylinder pressure Pm) may become larger than a predetermined required threshold for braking (a master cylinder pressure threshold Pmth). That is, the CPU of the 4WD ECU 110 may be configured to determine whether the master cylinder pressure Pm is larger than the master cylinder pressure threshold Pmth at Step 560A (not shown) in place of Step 560 shown in FIG. 5.

In this case, the first control device stores into the RAM, as the master cylinder pressure threshold Pmth, the master cylinder pressure Pm obtained when the braking force corresponding to the point P of FIG. 3 is generated, in advance. The first control device releases/cancels the differential restriction when the master cylinder pressure Prn becomes equal to or higher than the master cylinder pressure threshold Pmth, That is, the first control device releases/cancels the differential restriction at the point P where the master cylinder pressure Pm agrees with the master cylinder pressure threshold Pmth. Thereby, the braking force increases along the braking force distribution ratio in the two-wheel driving mode (the straight line L1) from the point P. As a result, when the braking force becomes the value corresponding to the point Q, the EBD control execution condition (the rear wheel slip ratio SLr>the front wheel slip ratio SLf) for the normal EBD control is satisfied.

When the EBD control starts to be performed/executed at the point Q, the pressures of the wheel cylinders 71RL and 71RR of the rear wheels are kept constant (held). As a result, as illustrated by the straight line L2 of FIG. 3, the braking force Fbr of the rear wheels is maintained at the constant value FbrQ corresponding to the point Q, even if the braking force Fbf of the front wheels increases.

Further, it may be determined that the specific state described above has occurred, when a magnitude (absolute value) of the acceleration/deceleration Gx of the vehicle becomes larger than a magnitude (absolute value) of an acceleration/deceleration threshold −gth. If the acceleration/deceleration Gx is a negative value and its magnitude is large, a large braking force seems to be generated. Therefore, when the acceleration/deceleration Gx becomes equal to or lower than the predetermined acceleration/deceleration threshold −gth (gth is a positive value), the first control device may set the coupling torque Tcu to "0". For example, as the acceleration/deceleration threshold −gth, an acceleration/deceleration may be adopted which is likely to be generated when the braking force corresponding to the point P of FIG. 3 is applied. Hereinafter, the acceleration/deceleration Gx is referred to as "deceleration Gx". The CPU of the 4WD ECU 110 may be configured to determine whether the magnitude (absolute value) of the deceleration Gx of the vehicle is larger than the magnitude (absolute value) of the deceleration threshold −gth (i.e., whether the deceleration Gx is smaller than the deceleration threshold −gth) at Step 560B (not shown) in place of Step 560 shown in FIG. 5.

Second Embodiment

A control device (hereinafter referred to as "second control device") according to a second embodiment of the present invention will next be described. The second control device is different from the first control device in that the second control device performs the "quick-depression EBD control" in addition to the normal EBD control described above.

The quick-depression EBD control is a control to start the EBD control regardless of the rear wheel slip ratio SLr and the front wheel slip ratio SLf in order to secure the travelling stability much earlier, when it is determined that a state of the vehicle becomes (changes into) a state where it is highly likely that the EBD control execution condition (the rear wheel slip ratio SLr>the front wheel slip ratio SLf) of the normal EBD control described above will be satisfied owing to the braking operation by the driver.

The execution condition of the quick-depression EBD control is satisfied/established, for example, when a rate dPm of change in the the master cylinder pressure Pm with respect to time (i.e., time change rate dPm of the master cylinder pressure Pm) exceeds (becomes larger than) a predetermined time change rate dPmth (dPm>dPmth).

Figure 6:
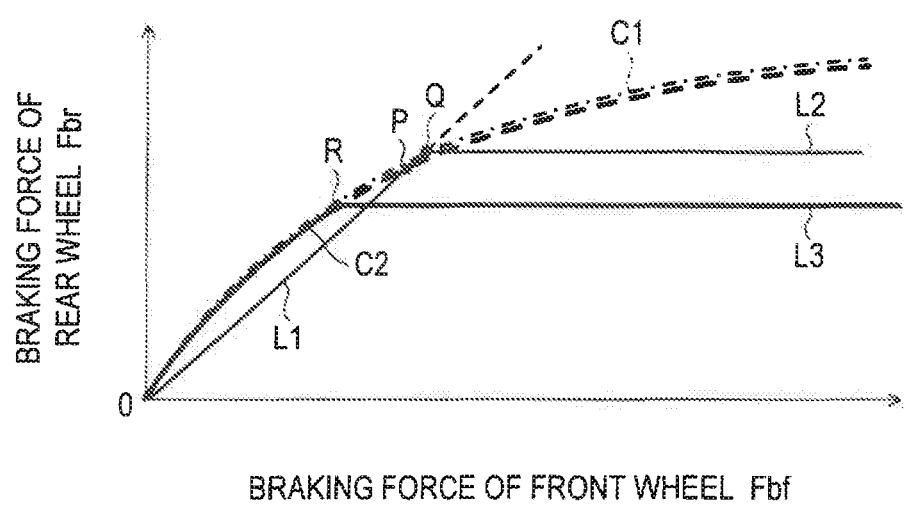
FIG. 6 is a diagram for explaining an operation of a control device for a four-wheel drive vehicle according to a second embodiment of the present invention.

The time change rate dPm of the master cylinder pressure Pm is high when the brake pedal 41 is greatly depressed within a short period of time from a state where the brake pedal 41 is not depressed. Thus, when the predetermined time change rate dPmth is selected/determined so as to be an appropriate value, the braking force of the front wheels and the braking force of the rear wheels when the time change rate dPm of the master cylinder pressure Pm exceeds the predetermined time change rate dPmth can be adjusted to coincide with the braking force of the front wheels and the braking force of the rear wheels which correspond to a point R illustrated in FIG. 6. The braking force of the front wheels corresponding to the point R is lower than the braking force of the front wheels corresponding to the point P, and the braking force of the rear wheels corresponding to the point R is lower than the braking force of the rear wheels corresponding to the point P. Therefore, when the time change rate dPm exceeds the predetermined time change rate dPmth, the second control device determines that the quick-depression EBD control execution condition is satisfied to start to perform/execute the EBD control. Hereinafter, the quick-depression EBD control execution condition is sometimes referred to as "specific condition".

When the quick-depression EBD control execution condition (the specific condition) is satisfied, the second control device firstly sets the coupling torque Tcu to "0" in order to perform the quick-depression EBD control, and subsequently sets the positions of the ABS holding valves 91RL and 91RR, and the positions of the ABS reducing valves 93RL and 93RR to the shut off positions to hold the braking force Fbr of the rear wheels. Consequently, the braking force distribution which has increased along the ideal distribution ratio (i.e., the front and rear contacting load distribution ratio) starts to deviate from the ideal distribution ratio at the point R, and thereafter, changes in parallel to the horizontal axis as indicated by a straight line L3 shown in FIG. 6.

(Specific Operation of Second Control Device)

Figure 7:
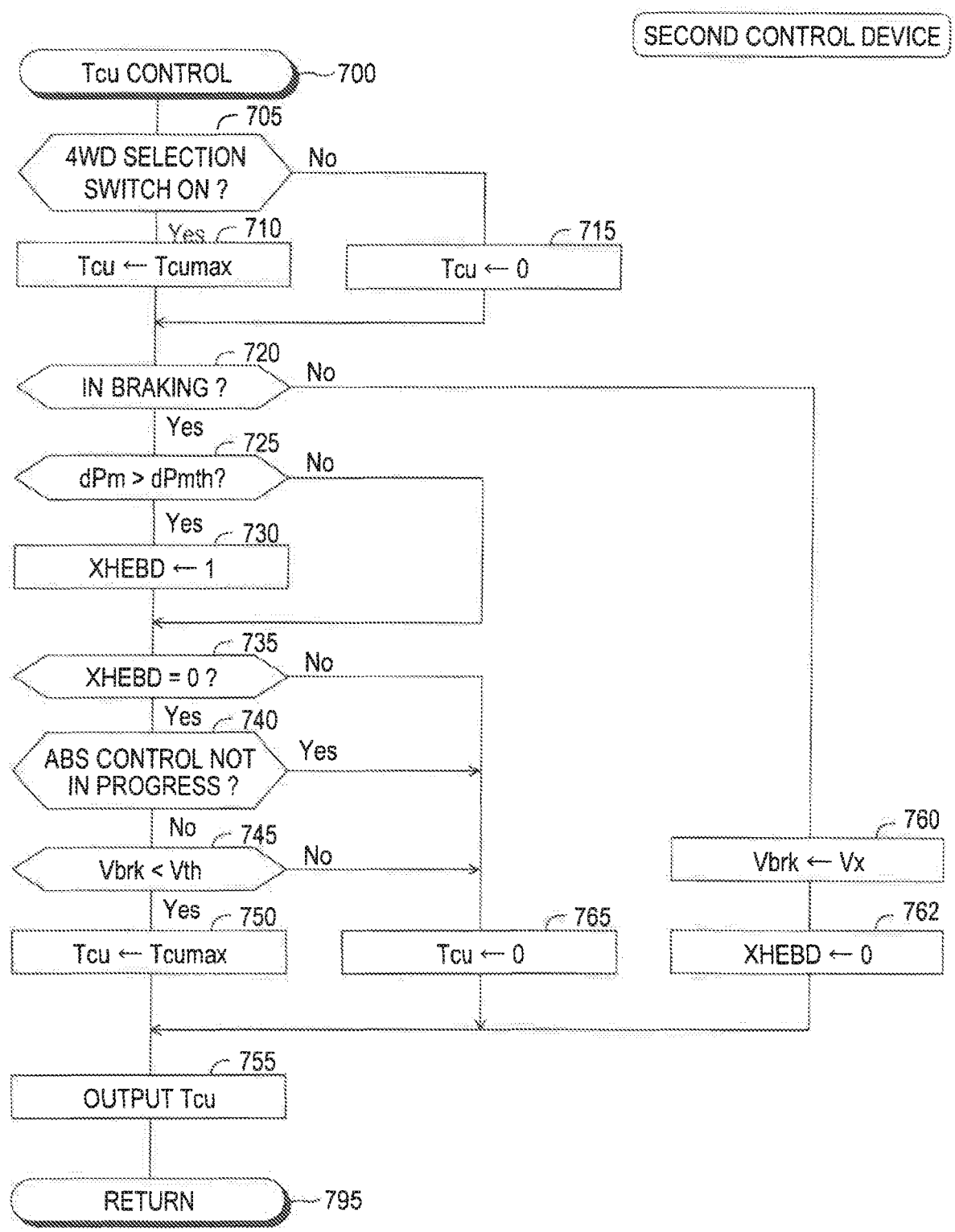
FIG. 7 is a flowchart for illustrating a "coupling torque control routine" executed by a CPU of a 4WD ECU of the control device for the four-wheel drive vehicle according to a second embodiment of the present invention.

Hereinafter, actual operations of the second control device will be described with reference to FIG. 7. The CPU of the 4WD ECU 110 is configured to execute a coupling torque control routine illustrated by a flowchart of FIG. 7 every time a constant time elapses. Hereinafter, the descriptions are made according to each of cases. It should be noted that the quick-depression EBD execution flag XHEBD is set to "0" in an initialization routine executed separately. The coupling torque Tcu is set to "0" in the initialization routine.

(1) A case where neither the normal EBD control execution condition nor the quick-depression EBD control execution condition is satisfied during braking.

The CPU starts the process from Step 700 at a certain time point to proceed to Step 705, at which the CPU determines whether the 4WD selection switch (not shown) is set at ON (on-state) by the driver of the vehicle. When the 4WD selection switch is set at "ON", the CPU makes a "Yes" determination at Step 705 to proceed to Step 710, at which the CPU sets the coupling torque Tcu to the maximum value Tcumax, and proceeds to Step 720. On the other hand, when the 4WD selection switch is set at "OFF" (off-state), the CPU makes a "No" determination at Step 705 to proceed to Step 715, at which the CPU sets the coupling torque TCU to "0", and proceeds to Step 720.

Subsequently, the CPU determines whether the braking is being operated at Step 720. More specifically, the CPU determines whether the master cylinder pressure Pm is equal to or higher than the predetermined value Pmth1.

When the master cylinder pressure Pm is higher than the predetermined value Pmth1 (that is, when the braking is being operated), the CPU makes a "Yes" determination at Step 720 to proceed to Step 725, at which the CPU determines whether the quick-depression EBD control execution condition is satisfied. That is, the CPU determines whether the time change rate dPm of the master cylinder pressure (a change amount per unit time of the master cylinder pressure Pm=dPm/dt) is larger than the predetermined time change rate dPmth.

According to the above assumption, the quick-depression EBD control execution condition is not satisfied. That is, the master cylinder pressure time change rate dPm (time change rate dPm of the master cylinder pressure) is equal to or smaller than the predetermined time change rate dPmth. Thus, the CPU makes a "No" determination at Step 725 to directly proceed to Step 735, at which the CPU determines whether the value of the quick-depression EBD execution flag XHEBD is "0". According to the above assumption, the value of the quick-depression EBD execution flag XHEBD is "0". Thus, the CPU makes a "Yes" determination at Step 735 to proceed to Step 740, at which the CPU determines whether the ABS control is not being performed.

When the ABS control is being performed, the CPU makes a "negative" determination at Step 740 to proceed to Step 765, at which the CPU sets the coupling torque Tcu to "0". In contrast, when the ABS control is not being performed, the CPU makes an "affirmative" determination at Step 740 to proceed to Step 745, at which the CPU determines whether the normal EBD control execution condition is unsatisfied. That is, the CPU determines whether the vehicle body speed Vbrk at the start of braking is lower than the predetermined vehicle body speed threshold Vth.

According to the above assumption, the normal EBD control execution condition is not satisfied. That is, the vehicle body speed Vbrk at the start of braking is lower than the predetermined vehicle body speed threshold Vth. Thus, the CPU makes a "Yes" determination at Step 745 to proceed to Step 750, at which the CPU sets the coupling torque Tcu to the maximum value Tcumax. Subsequently, the CPU proceeds to Step 755 to control the differential restriction device 34 in such a manner that the actual coupling torque agrees with (or becomes equal to) the set coupling torque Tcu, and proceeds to Step 795 to tentatively terminate the present routine.

(2) A case where the normal EBD control execution condition is not satisfied, but the quick-depression EBD control execution condition is satisfied, during braking.

The CPU starts the process from Step 700 at a certain time point. The CPU makes "Yes" determinations both at Step 720 and at Step 725 based on the above assumption. Thus, the CPU proceeds to Step 730 to set the value of the quick-depression EBD execution flag XHEBD to "1". Subsequently, the CPU makes a "No" determination at Step 735 to proceed to Step 765, at which the CPU sets the coupling torque Tcu to "0". Thereafter, the CPU proceeds to Step 755 to control the differential restriction device 34 in such a manner that the actual coupling torque agrees with (or becomes equal to) the set coupling torque Thu, and proceeds to Step 795 to tentatively terminate the present routine.

(3) A case where the normal EBD control execution condition is satisfied during braking.

The CPU starts the process from Step 700 at a certain time point. When the CPU proceeds to Step 720, the CPU makes a "Yes" determination at Step 720. Thereafter, the CPU makes a "No" determination at Step 725, and a "Yes" determination at Step 735, according to the above assumption, and then proceeds to Step 740. When the ABS control is being performed, the CPU makes a "negative" determination at Step 740 to proceed to Step 765, at which the CPU sets the coupling torque Tcu to "0". Subsequently, the CPU proceeds to Step 755 to control the differential restriction device 34 in such a manner that the actual coupling torque agrees with (or becomes equal to) the set coupling torque Tcu, and proceeds to Step 795 to tentatively terminate the present routine.

On the other hand, when the ABS control is not being executed, the CPU makes an "affirmative" determination at Step 740 to proceed to Step 745. According to the above assumption, the normal EBD control execution condition is satisfied. That is, the vehicle body speed Vbrk at the start of braking is equal to or higher than the predetermined vehicle body speed threshold Vth. Thus, the CPU makes a "No" determination at Step 745 to proceed to Step 765, at which the CPU sets the coupling torque Tcu to "0". Subsequently, the CPU proceeds to Step 755 to control the differential restriction device 34 in such a manner that the actual coupling torque agrees with (or becomes equal to) the set coupling torque Tcu, and proceeds to Step 795 to tentatively terminate the present routine.

(4) A case where braking is not operated.

The CPU starts the process from Step 700 at a certain time point. When the CPU proceeds to Step 720, the CPU makes a "No" determination at Step 720 according to the above assumption to proceed to Step 760. At Step 760, the CPU estimates the vehicle body speed Vx based on the wheel speeds Vw of the wheels, and stores, as the vehicle body speed Vbrk at the start of braking, the vehicle body speed Vx into the RAM. Subsequently, the CPU proceeds to Step 762 to set the value of the quick-depression EBD execution flag XHEBD to "0". Thereafter, the CPU proceeds to Step 755 to control the differential restriction device 34 in such a manner that the actual coupling torque agrees with (or becomes equal to) the set coupling torque Tcu, and proceeds to Step 795 to tentatively terminate the present routine.

As described above, the second control device changes the differential restriction degrees from the second degree to the first degree to start to perform the EBD control, when the second control device determines that the specific condition (that is, the quick-depression EBD control execution condition) becomes satisfied. The specific condition is satisfied when the specific state is likely to occur, the specific state being the state where it is likely that a situation occurs where the rear wheel slip ratio SLr is larger than the front wheel slip ratio SLf under the assumption that the differential restriction degree is set to the first degree. The specific condition is satisfied, for example, when the time change rate dPm of the master cylinder pressure Pm (serving as a time change rate of the required braking force by the driver of the vehicle) becomes equal to or larger than the predetermined time change rate dPmth. Accordingly, the second control device can secure the lateral force of the rear wheels to secure the travelling stability of the vehicle even if the braking force becomes large while the vehicle is travelling in the four-wheel driving mode.

Third Embodiment

A control device (hereinafter also referred to as "third control device") according to a third embodiment of the present invention will next be described. The third control device is different from the second control device in that the third control device performs quick-depression EBD recovery control, in addition to the normal EBD control and the quick-depression EBD control. Hereinafter, a coupling torque control for the quick-depression EBD recovery control by the third control device will be described.

The quick-depression EBD recovery control is a control to increase the braking force of the rear wheels up to a predetermined braking force when it is determined that the braking force of the rear wheels is insufficient in a case where the quick-depression EBD control is being executed after the quick-depression EBD control execution condition has been satisfied. In the above description, the quick-depression EBD control execution condition becomes satisfied when the time change rate dPm of the master cylinder pressure Pm becomes equal to or greater than dPmth.

Figure 8:
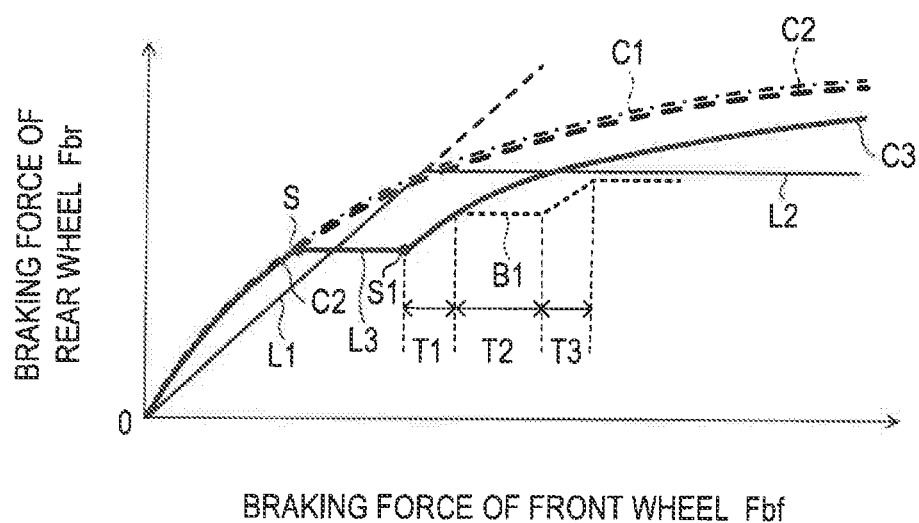
FIG. 8 is a diagram for explaining an operation of a control device for a four-wheel drive vehicle according to a third embodiment of the present invention.

As shown in FIG. 8, the braking force Fbr of the rear wheels is held/kept at the braking force corresponding to the point S when the braking force Fbf of the front wheels becomes larger than the braking force Fbf of the front wheels corresponding to the point S by the EBD control after the quick-depression EBD control execution condition is satisfied at the point S. Thus, as the braking force Fbf of the front wheels increases, the braking force distribution ratio more deviates from the ideal distribution ratio so that the braking performance may degrade (that is, the braking force of the rear wheels may become insufficient). That is, as the braking force Fbf of the front wheels further increases from the braking force corresponding to the point S, a deviation (difference) SLf−SLr between the front wheel slip ratio at and the rear wheel slip ratio SLr increases. In other words, as the braking force Fbf of the front wheels increases, a deviation (difference) between the wheel speed Vwr of the rear wheels and the wheel speed Vwf of the front wheels increases.

Therefore, in order to secure the braking performance when the quick-depression EBD control is being executed, the third control device executes the quick-depression EBD recovery control to increase the braking force Fbr of the rear wheels up to a braking force which can provide a sufficient braking performance, when the deviation Vwr−Vwf between the wheel speed Vwr of the rear wheels and the wheel speed Vwf of the front wheels becomes larger than a predetermined deviation ΔVth.

One of methods for increasing the braking force Fbr of the rear wheels when the EBD control is being executed includes a step for switching the valve positions of the ABS holding valves 91RL and 91RR from the shut-off positions to the communication positions. First, the method will be more specifically described with reference to FIG. 8.

Assuming that the master cylinder pressure Pm (or the brake pedal depression amount BP) increases at a constant rate, and thus, the braking force Fbf of the front wheels increases at a constant rate with the lapse of time, each of lines shown in a graph of FIG. 8 represents a change in the braking force Fbr of the rear wheels with respect to time. Hereinafter, descriptions are made by replacing the horizontal axis of the graph illustrated in FIG. 8 with (lapse of) time. When the condition (the EBD recovery control execution condition) to increase the braking force Fbr of the rear wheels becomes satisfied, the positions of the ABS holding valves 91RL and 91RR for the rear wheels are firstly switched from the shut-off positions to the communication positions at the point S1. Thereafter, those positions are maintained at the communication positions for a first predetermined time period T1. Thus, the wheel cylinder pressure Pwr of the rear wheels increases during the first predetermined time period T1.

Subsequently, after the first predetermined time period T1, the positions of the ABS holding valves 91RL and 91RR are switched from the communication positions to the shut-off positions. Thereafter, those positions are maintained at the shut-off positions for the second predetermined time period T2. That is, as indicated by the broken line B1, the wheel cylinder pressure Pwr of the rear wheels is kept constant and the braking force Fbr of the rear wheels is kept constant during the second predetermined time period T2. Thereafter, the positions of the ABS holding valves 91RL and 91RR are held at the communication positions again for the third predetermined time period T3. Consequently, the wheel cylinder pressure Pwr of the rear wheels and the braking force Fbr of the rear wheels increase. This series of operations are repeated until the braking force Fbr of the rear wheels reaches a predetermined braking force.

According to the method described above, the valve positions of the ABS holding valves 91RL and 91RR for the rear wheels are frequently switched while generating operating sounds. As a result, the operating sounds may be recognized as noise. Further, the wheel cylinder pressure Pwr of the rear wheels changes in a stepwise fashion, and thus, the change in pressure of the hydraulic fluid is transmitted to the brake pedal 41. This may cause the drive to feel a sense of discomfort (hereinafter, this phenomenon is referred to as "pedal kick back").

In view of the above, the quick-depression EBD recovery control according to the third embodiment is performed as follows. When a condition to increase the braking force Fbr of the rear wheels becomes satisfied at the point Si, the third control device increases the differential restriction degrees from the first degree (realized when the coupling torque Tcu is "0") to a third degree. The third degree gradually increases and is a value that is larger than the first degree and smaller than the second degree (realized when the coupling torque Tcu is the maximum value Tcumax). Accordingly, the third control device can increase the braking force Fbr of the rear wheels from the braking force corresponding to the point S1 as indicated by a curved line C3 of FIG. 8 by increasing the coupling torque Tcu even though the positions of the ABS holding valves 91RL and 91RR are held at the shut-off positions.

(Specific Operation of Third Control Device)

Figure 9:
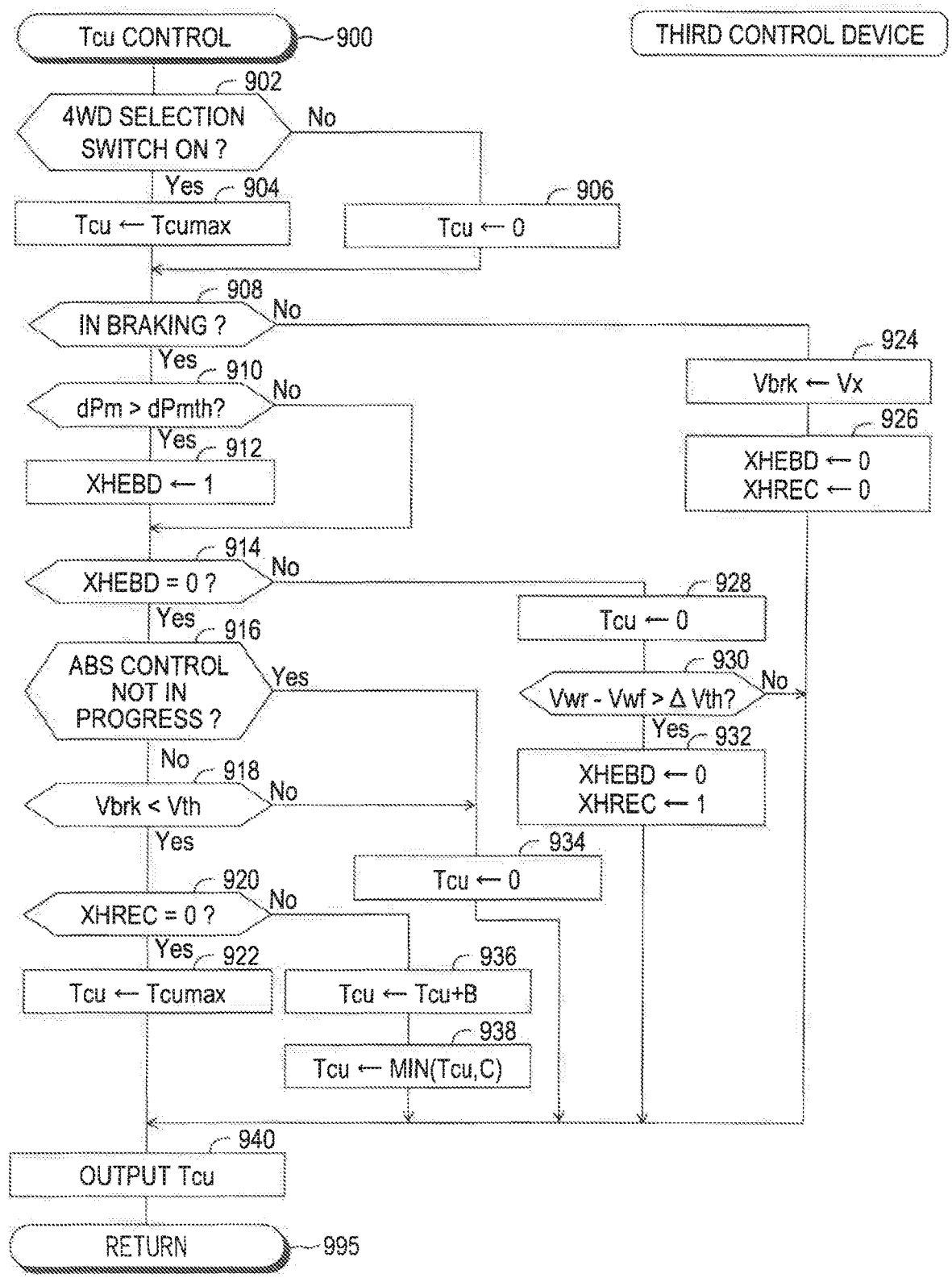
FIG. 9 is a flowchart for illustrating a "coupling torque control routine" executed by a CPU of a 4WD ECU of the control device for the four-wheel drive vehicle according to a third embodiment of the present invention.

Hereinafter, actual operations of the third control device will be described with reference to FIG. 9. The CPU of the 4WD ECU 110 is configured to execute a coupling torque control routine illustrated by a flowchart of FIG. 9 every time a constant time elapses. When the value of a quick-depression EBD recovery flag XHREC is "1", the quick-depression EBD recovery control is permitted. When the value of the quick-depression EBD recovery flag XHREC is "0", the quick-depression EBD recovery control is prohibited. The value of the quick-depression EBD execution flag XHEBD and the value of the quick-depression EBD recovery flag XHREC are set to "0" through an initialization routine (not shown). Hereinafter, the descriptions are made according to each of cases.

(1) When any of the normal EBD control execution condition, the quick-depression EBD control execution condition, and the quick-depression EBD recovery control execution condition are not satisfied, during braking.

The CPU starts the process from Step 900 at a certain time point to proceed to Step 902, at which the CPU determines whether the 4WD selection switch is set at "ON" (on-state) by the driver of the vehicle. When the 4WD selection switch is set at "ON", the CPU makes a "Yes" determination at Step 902 to proceed to Step 904, at which the CPU sets the coupling torque Tcu to the maximum value Tcumax to proceed to Step 908. On the other hand, when the 4WD selection switch is set at "OFF" (off-state), the CPU makes a "No" determination at Step 902 to proceed to Step 906, at which the CPU sets the coupling torque Tcu to "0" to proceed to Step 908.

Subsequently, the CPU makes a "Yes" determination at Step 908 based on the above assumption to proceed to Step 910, at which the CPU determines whether the time change rate dPm of the master cylinder pressure is larger than the predetermined time change rate dPmth. According to the above assumption, the quick-depression EBD control execution condition is not satisfied. Therefore, the time change rate dPm of the master cylinder pressure is equal to or less than the predetermined time change rate dPmth. Thus, the CPU makes "No" determination at Step 910 to directly proceed to Step 914, at which the CPU determines whether the value of the quick-depression EBD execution flag XHEBD is "0". According to the above assumption, the value of the quick-depression EBD execution flag XHEBD is "0". Thus, the CPU makes a "Yes" determination at Step 914 to proceed to Step 916, at which the CPU determines whether the ABS control is not executed.

When the ABS control is executed, the CPU makes a "negative" determination at Step 916 to proceed to Step 934, at which the CPU sets the coupling torque Tcu to "0". That is, the CPU sets the travelling mode of the vehicle 10 to the two-wheel driving mode. Subsequently, the CPU proceeds to Step 940 to control the differential restriction device 34 in such a manner that the actual coupling torque agrees with (or becomes equal to) the set coupling torque Tcu, and proceeds to Step 995 to tentatively terminate the present routine.

In contrast, when the ABS control is not executed, the CPU makes an "affirmative" determination at Step 916 to proceed to Step 918, at which the CPU determines whether the vehicle body speed Vbrk at the start of braking is lower than the predetermined vehicle body speed threshold Vth. According to the above assumption, the normal EBD control execution condition is not satisfied. That is, the vehicle body speed Vbrk at the start of braking is lower than the predetermined vehicle body speed threshold Vth. Thus, the CPU makes a "Yes" determination at Step 918 to proceed to Step 920, at which the CPU determines whether the value of the quick-depression EBD recovery flag XHREC is "0".

According to the above assumption, the quick-depression EBD recovery control execution condition is not satisfied. That is, the value of the quick-depression EBD recovery flag XHREC is "0". Thus, the CPU makes a "Yes" determination at Step 920 to proceed to Step 922, at which the CPU sets the coupling torque Thu to the maximum value Tcumax. Subsequently, the CPU proceeds to Step 940 to control the differential restriction device 34 in such a manner that the actual coupling torque agrees with (or becomes equal to) the set coupling torque Tcu, and proceeds to Step 995 to tentatively terminate the present routine.

(2) When the normal EBD control execution condition is not satisfied, the quick-depression EBD control execution condition is satisfied, and the quick-depression EBD recovery control execution condition is not satisfied, during braking.

The CPU starts the process from Step 900 at a certain time point. When the CPU proceeds to Step 908, based on the above assumption, the CPU makes a "Yes" determination at Step 908 to proceed to Step 910. Based on the above assumption, the CPU makes a "Yes" determination at Step 910 to proceed to Step 912, eat which the CPU sets the value of the quick-depression EBD execution flag XHEBD to "1". Subsequently, the CPU makes a "No" determination at Step 914 to proceed to Step 928, at which the CPU sets the coupling torque Tcu to "0".

Subsequently, the CPU proceeds to Step 930, at which the CPU determines whether the quick-depression EBD recovery control execution condition is satisfied. That is, the CPU determines whether the deviation Vwr−Vwf (wheel speed deviation) between the wheel speed Vwr of the rear wheels and the wheel speed Vwf of the front wheels is larger than the predetermined wheel speed deviation threshold ΔVth. According to the above assumption, the quick-depression EBD recovery control execution condition is not satisfied. Thus, the CPU makes a "No" determination at Step 930 to directly proceed to Step 940, at which the CPU controls the differential restriction device 34 in such a manner that the actual coupling torque agrees with (or becomes equal to) the set coupling torque Tcu, and proceeds to Step 995 to tentatively terminate the present routine.

(3) When neither the normal EBD control execution condition nor the quick-depression EBD control execution condition is satisfied after the quick-depression EBD control execution condition was satisfied, and the quick-depression EBD recovery control execution condition is satisfied, during braking.

When quick-depression EBD control execution condition is satisfied (that is, the deviation Vwr−Vwf became larger than the predetermined wheel speed deviation threshold ΔVth), the CPU made a "Yes" determination at Step 930 to proceed to Step 932, at which the CPU sets the value of the quick-depression EBD execution flag XHEBD to "0", and sets the value of the quick-depression EBD recovery flag XHREC to "1". Thereafter, the CPU proceeded to Step 940 and Step 995.

Thereafter, when the CPU proceeds to Step 908, the CPU makes a "Yes" determination at Step 908, a "No" determination at Step 910, and a "Yes" determination at Step 914, respectively based on the above assumption, to proceed to Step 916.

When the ABS control is being executed, the CPU makes a "negative" determination at Step 916 to proceed to Step 934, at which the CPU sets the coupling torque Tcu to "0". On the other hand, when the ABS control is not being executed, the CPU makes an "affirmative" determination at Step 916, and makes a "Yes" determination at Step 918 to proceed to Step 920. According to the above assumption, the quick-depression EBD recovery execution condition is satisfied (the value of the quick-depression EBD recovery flag XHREC is "1"). Thus, the CPU makes a "No" determination at Step 920 to proceed to Step 936, at which the CPU increases the value of the coupling torque Tcu by a predetermined value B which is relatively small value, then the CPU proceeds to Step 938.

When the coupling torque Tcu is larger than a predetermined value C, the CPU selects the predetermined value C as the coupling torque Tcu at Step 938. That is, the CPU limits the coupling torque Tcu in such a manner that the coupling torque Tcu does not exceed the predetermined value C. Subsequently, the CPU proceeds to Step 940 to control the differential restriction device 34 based on the set coupling torque Tcu, and proceeds to Step 995 to tentatively terminate the present routine.

(4) When the normal EBD control execution condition is satisfied, during braking.

The CPU starts the process from Step 900 at a certain time point. When the 4WD selection switch is set at "ON", the CPU makes a "Yes" determination at Step 902 to proceed to Step 904, at which the CPU sets the coupling torque Tcu to the maximum value Tcumax to proceed to Step 908. On the other hand, when the 4WD selection switch is set at "OFF", the CPU makes a "No" determination at Step 902 to proceed to Step 900, at which the CPU sets the coupling torque Tcu to "0" to proceed to Step 908.

Subsequently, according to the above assumption, the CPU makes a "Yes" determination at Step 908, a "No" determination at Step 910, and a "Yes" determination at Step 914 to proceed to Step 916. When the ABS control is being executed, the CPU makes a "negative" determination at Step 916 to proceed to Step 934, at which the CPU sets the coupling torque Tcu to "0". Subsequently, the CPU proceeds to Step 940 to control the differential restriction device 34 based on the set coupling torque Tcu, and proceeds to Step 995 to tentatively terminate the present routine.

On the other hand, when the ABS control is not being executed, the CPU makes an "affirmative" determination at Step 916 to proceed to Step 918. According to the above assumption, the normal EBD control execution condition is satisfied. That is, he vehicle body speed Vbrk at the start of braking is equal to or higher than the predetermined vehicle body speed threshold Vth. Thus, the CPU makes a "No" determination at Step 918 to proceed to 934, at which the CPU sets the coupling torque Tcu to "0". Subsequently, the CPU proceeds to Step 940 to control the differential restriction device 34 based on the set coupling torque Tcu, and proceeds to Step 995 to tentatively terminate the present routine.

(5) When braking is not operated.

When the 4WD selection switch is set at "ON", the CPU makes a "Yes" determination at Step 902 to proceed to Step 904, at which the CPU sets the coupling torque Tcu to the maximum value Tcumax to proceed to Step 908. On the other hand, when the 4WD selection switch is set at "OFF" the CPU makes a "No" determination at Step 902 to proceed to Step 906 at which the CPU sets the coupling torque Tcu to "0" to proceed to Step 908.

At Step 908, the CPU makes a "No" determination to proceed to Step 924, at which the CPU sets the estimated vehicle body speed Vx at this time point, as the vehicle body speed Vbrk at the start of braking. Subsequently, the CPU proceeds to Step 926, at which the CPU sets the value of the quick-depression EBD execution flag XHEBD and the value of the quick-depression EBD recovery flag XHREC to "0". Thereafter, the CPU proceeds to Step 940 to control the differential restriction device 34 based on the set coupling torque Tcu, and proceeds to Step 995 to tentatively terminate the present routine.

As described above, when it is determined that the specific condition (that is, the quick-depression EBD control execution condition) which is satisfied when the specific state is likely to occur is satisfied, the third control device changes the differential restriction degrees from the second degree to the first degree to keep/hold the braking force Fbr of the rear wheels by the EBD control. The specific state is the state where it is likely that a situation occurs where the rear wheel slip ratio SLr is higher than the front wheel slip ratio SLf under the assumption that the differential restriction degree is set to the first degree. The specific condition is satisfied, for example, when the time change rate dPm of the master cylinder pressure Pm (serving as a time change rate of the required braking force by the driver of the vehicle) becomes equal to or larger than the predetermined time change rate dPmth. Further, when the deviation (Vwr−Vwf) between the wheel speed Vwr of the rear wheels and the wheel speed Vwf of the front wheels becomes larger than the predetermined deviation ΔVth, the third control device changes the differential restriction degrees to the third degree which is larger than the first degree and smaller than the second degree (and which gradually increases up to a certain degree).

Accordingly, the braking force Fbr of the rear wheels can be recovered/increased so that the driver does not feel any discomfort, when and after the braking force Fbr of the rear wheels becomes insufficient by the quick-depression EBD control.

<Modification>

The present invention is not limited to the embodiments described above, and various modifications can be adopted within the scope of the present invention as described below.

The vehicle body speed Vbrk at the start of braking is used as the value (a value concerning the occurrence of the specific state) concerning the establishment of the EBD control execution condition in the first control device to the third control device. However, the aforementioned master cylinder pressure Pm and/or the deceleration Gx of the vehicle 10 may be used as the value concerning the occurrence of the specific state.

Further, any combination of those three parameters may be selected as the value concerning the occurrence of the specific state. That is, a combination of the vehicle body speed Vbrk at the start of braking and the master cylinder pressure Pm may be used, a combination of the vehicle body speed Vbrk at the start of braking and the deceleration Gx may be used, and a combination of the master cylinder pressure Pm and the deceleration Gx may be used, as the value concerning the occurrence of the specific state. Further, all of the three parameters may be used as the value concerning the occurrence of the specific state.

Hereinafter, as a modification, an example in which the EBD execution condition is satisfied when any one of the three parameters (the vehicle body speed Vbrk at the start of braking, the master cylinder pressure Pm, and the deceleration Gx) satisfies a respective condition will be specifically described.

Figure 10:
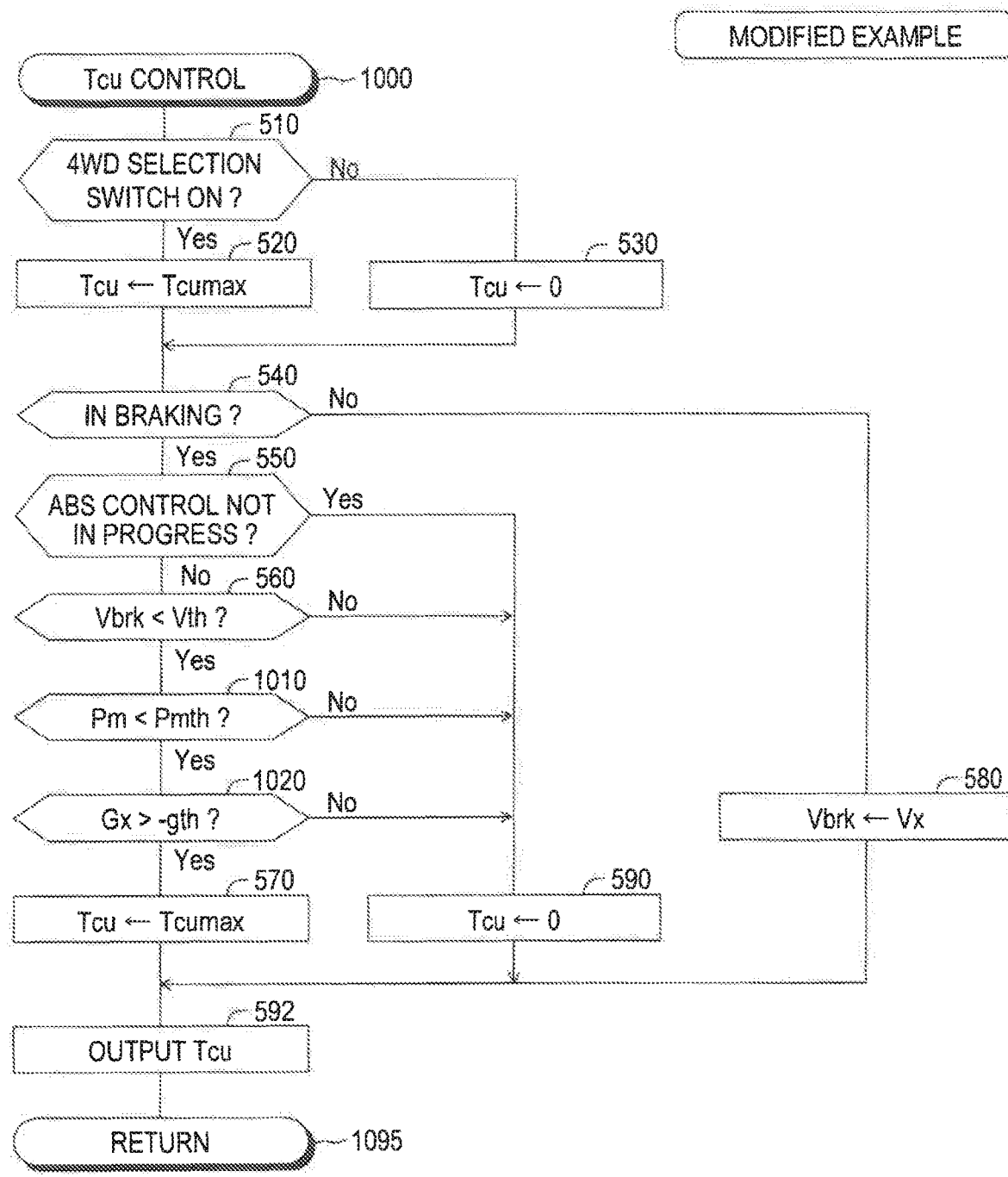
FIG. 10 is a flowchart for illustrating a "coupling torque control routine" executed by a CPU of a 4WD ECU of a control device for a four-wheel drive vehicle according to a modification of the first embodiment of the present invention.

The CPU of the 4WD ECU 110 is configured to execute a coupling torque control routine illustrated by a flowchart of FIG. 10 every time a constant time elapses. It is noted that the common reference numerals are used for the same steps in FIG. 10 as the steps in FIG. 5.

The CPU starts the process from Step 1000 at a predetermined time point to proceed to Step 510 at which the CPU determines whether the 4WD selection switch is set at "ON". When the 4WD selection switch is set at "ON", the CPU makes a "Yes" determination at Step 510 to proceed to Step 520, at which the CPU sets the coupling torque Tcu to the maximum value Tcumax to proceed to Step 540. On the other hand, when the 4WD selection switch is set at "OFF", the CPU makes a "No" determination at Step 510 to proceed to Step 530, at which the CPU sets the coupling torque Tcu to "0" to proceed to Step 540.

Subsequently, the CPU determines whether the braking is being executed at Step 540. When the braking is not being executed, the CPU makes a "No" determination at Step 540 to proceed to Step 580, at which the CPU sets the vehicle body speed Vx at this time point as the vehicle body speed Vbrk at the start of braking and stores it in the RAM. Subsequently, the CPU proceeds to Step 592 to control the differential restriction device 34 in such a manner that the actual coupling torque agrees with (or becomes equal to) the set coupling torque Tcu, and proceeds to Step 1095 to tentatively terminate the present routine.

On the other hand, when the braking is being executed, the CPU makes a "Yes" determination at Step 540 to proceed to Step 550, at which the CPU determines whether the ABS control is not being executed. When the ABS control is being executed, the CPU makes a "negative" determination at Step 550 to proceed to Step 590, at which the CPU sets the coupling torque Tcu to "0". Subsequently, the CPU proceeds to Step 592 to control the differential restriction device 34 in such a manner that the actual coupling torque agrees with (or becomes equal to) the set coupling torque Tcu, and proceeds to Step 1095 to tentatively terminate the present routine.

On the other hand, when the ABS control is not executed, the CPU makes an "affirmative" determination at Step 550 to proceed to Step 560, at which the CPU determines whether the vehicle body speed Vbrk at the start of braking is lower than the predetermined vehicle body speed threshold Vth.

When the vehicle body speed Vbrk at the start of braking is lower than the predetermined vehicle body speed threshold Vth, the CPU makes a "Yes" determination at Step 560 to proceed to Step 1010, at which the CPU determines whether the master cylinder pressure Pm is lower than the predetermined master cylinder pressure threshold Pmth.

When the master cylinder pressure Pm is lower than the predetermined master cylinder pressure threshold Pmth, the CPU makes a "Yes" determination at Step 1010 to proceed to Step 1020, at which the CPU determines whether the acceleration/deceleration Gx is larger than the deceleration threshold −gth.

When the acceleration/deceleration Gx is larger than the predetermined deceleration threshold h the CPU makes "Yes" determination at Step 1020 to proceed to Step 570, at which the CPU sets the coupling torque Tcu to the maximum value Tcumax. Subsequently, the CPU proceeds to Step 592 to control the differential restriction device 34 in such a manner that the actual coupling torque agrees with (or becomes equal to) the set coupling torque Tcu, and proceeds to Step 1095 to tentatively terminate the present routine.

Thus, the braking is executed in the four-wheel driving mode, when (A) the vehicle body speed Vbrk at the start of braking is lower than the predetermined vehicle body speed threshold Vth, (B) the master cylinder pressure Pm is lower than the predetermined master cylinder pressure threshold Pmth and (C) the acceleration/deceleration Gx is larger than the deceleration threshold −gth.

On the other hand, when the vehicle body speed Vbrk at the start of braking is equal to or higher than the predetermined vehicle body speed threshold Vth, the master cylinder pressure Pm is equal to or larger than the predetermined master cylinder pressure threshold Pmth, or the acceleration/deceleration Gx is equal to or smaller than the deceleration threshold th, the CPU makes a "No" determinations at Step 560, Step 1010, or Step 1020, respectively, to proceed to Step 590.

The CPU sets the coupling torque Tcu to "0" at Step 590, and proceeds to Step 592 to control the differential restriction device 34 in such a manner that the actual coupling torque agrees with (or becomes equal to) the set coupling torque Tcu, and proceeds to Step 1095 to tentatively terminate the present routine.

Each of the state where the vehicle body speed Vbrk at the start of braking is equal to or higher than the predetermined vehicle body speed threshold Vth, the state where the master cylinder pressure Pm is equal to or higher than the predetermined master cylinder pressure threshold Pmth, and the state where the deceleration Gx is equal to or lower than the predetermined deceleration threshold −gth is a "state where the rear wheel slip ratio SLr is likely to exceed the front wheel slip ratio SLf (in other words, the state where the EBD control execution condition is likely to be satisfied)". Thus, when any one of the states described above is detected, the EBD control execution condition is satisfied to allow the EBD control to be started.

<Other Modifications>

In the embodiments described above, whether the braking is being executed is determined by determining whether the master cylinder pressure Pm is equal to or higer than the predetermined value Pmth1. However, whether the braking braking is being executed in the vehicle 10 may be determined by determining whether the braking pedal depression amount BP is equal to or larger than the predetermined depression amount threshold BPth.

In the embodiments described above, the quick-depression EBD control execution condition (the specific condition) is determined to be satisfied when the time change rate dPm of the master cylinder pressure Pm is equal to or larger than the predetermined time change rate dPmth. However, the specific condition may be determined to be satisfied when the time change rate dBP of the brake pedal depression amount BP (a change amount dBP per unit time of the brake pedal depression amount BP) is equal to or larger than a predetermined time change rate dBPth.

In the third embodiment, the condition for increasing the braking force Fbr of the rear wheels is satisfied when the deviation Vwr−Vwf between the wheel speed Vwr of the rear wheels and the wheel speed Vwf of the front wheels is equal to or larger than the predetermined wheel speed deviation threshold ΔVth. However, the condition for increasing the braking force Fbr may be determined to be satisfied when a deviation SLf−SLr between the front wheel slip ratio SLf and the rear wheel slip ratio SLr is equal to or larger than a predetermined slip ratio deviation.

In the embodiments described above, the CPU of the 4WD ECU 110 executes the coupling torque control routine. However, the CPU of the braking ECU 120 may execute the above routine instead of the CPU of the 4WD ECU 110. Further, the CPU of the 4WD ECU 110 and the CPU of the braking ECU 120 may cooperate to execute the coupling torque control routine. Furthermore, those ECUs are integrated into one ECU, and a CPU of the integrated ECU may execute the coupling torque control routine.

What is claimed is:

1. A control device for four-wheel drive vehicle, which is applied to a four-wheel drive vehicle having:
   an engine or an electric motor configured to generate a driving force;
   a center differential device configured to transmit the driving force to a front wheel rotary shaft and a rear wheel rotary shaft and allow a differential operation between the front wheel rotary shaft and the rear wheel rotary shaft;
   a differential restriction device installed in the center differential device, the differential restriction device being configured to vary a differential restriction degree between the front wheel rotary shaft and the rear wheel rotary shaft; and
   a brake configured to vary a braking force of front wheels and a braking force of rear wheels, separately,
   the control device comprising:
   a differential restriction control processor configured to adjust the differential restriction degree; and
   a braking control processor configured to execute an EBD control for adjusting the braking force of the front wheels and the braking force of the rear wheels to have the braking force of the rear wheels become smaller than a braking force of the rear wheels determined based on an ideal distribution ratio obtained when a slip ratio of the front wheels and a slip ratio of the braking force of the rear wheels are equal to each other, when a request for braking the vehicle occurs and the differential restriction degree is set at a first degree by the differential restriction control unit processor to allow a complete differential operation between the front wheel rotary shaft and the rear wheel rotary shaft achieved so that the front wheel rotary shaft and the rear wheel rotary shaft are allowed to rotate freely with each other,
   wherein,
   the differential restriction control processor is configured to:
   determine whether a specific state has occurred, the specific state being a state where it is likely that a situation occurs where the slip ratio of the rear wheels is larger than the slip ratio of the front wheels under an assumption that the differential restriction degree is set to the first degree, when the differential restriction control processor sets the differential restriction degree at a second degree to prohibit the differential operation; and
   change the differential restriction degree from the second degree to the first degree when it is determined that the specific state has occurred.

2. The control device for a four-wheel drive vehicle according to claim 1, wherein the differential restriction control processor is configured to determine that the specific state has occurred, when a condition that a vehicle body speed at a start of braking by the brake is equal to or higher than a predetermined vehicle body speed threshold becomes satisfied.

3. The control device for a four-wheel drive vehicle according to claim 2, wherein the differential restriction control processor is configured to change the differential restriction degree to a third degree which is larger than the first degree and is smaller than the second degree when a deviation between a wheel speed of the rear wheels and a wheel speed of the front wheels exceeds a predetermined deviation in a case where the differential restriction degree is changed from the second degree to the first degree.

4. The control device for a four-wheel drive vehicle according to claim 1, wherein the differential restriction control processor is configured to determine that the specific state has occurred when a condition that a braking request value by a driver of the vehicle is equal to or larger than a predetermined braking request threshold becomes satisfied.

5. The control device for a four-wheel drive vehicle according to claim 4, wherein the differential restriction control processor is configured to change the differential restriction degree to a third degree which is larger than the first degree and is smaller than the second degree when a deviation between a wheel speed of the rear wheels and a wheel speed of the front wheels exceeds a predetermined deviation in a case where the differential restriction degree is changed from the second degree to the first degree.

6. The control device for a four-wheel drive vehicle according to claim 1, wherein the differential restriction control processor is configured to determine that the specific state has occurred when a condition that a magnitude of a deceleration of the vehicle is equal to or larger than a predetermined deceleration threshold becomes satisfied.

7. The control device for a four-wheel drive vehicle according to claim 6, wherein the differential restriction control unit processor is configured to change the differential restriction degree to a third degree which is larger than the first degree and is smaller than the second degree when a deviation between a wheel speed of the rear wheels and a wheel speed of the front wheels exceeds a predetermined deviation in a case where the differential restriction degree is changed from the second degree to the first degree.

8. The control device for a four-wheel drive vehicle according to claim 1, wherein the differential restriction control processor is configured to change the differential restriction degree to a third degree which is larger than the first degree and is smaller than the second degree when a deviation between a wheel speed of the rear wheels and a wheel speed of the front wheels exceeds a predetermined deviation in a case where the differential restriction degree is changed from the second degree to the first degree.

* * * * *